United States Patent [19]
Rana

[11] Patent Number: 5,968,188
[45] Date of Patent: Oct. 19, 1999

[54] SYSTEM FOR PROVIDING REAL-TIME CODE COVERAGE

[75] Inventor: Arvind Rana, Westerville, Ohio

[73] Assignee: Grammar Engine, Westerville, Ohio

[21] Appl. No.: 09/037,369

[22] Filed: Mar. 10, 1998

[51] Int. Cl.⁶ .................................................. G06F 11/20
[52] U.S. Cl. ................................. 714/29; 714/45; 714/32
[58] Field of Search .......................... 395/183.04, 183.05, 395/183.06, 183.01, 183.21, 184.01, 500, 183.08; 371/27.4, 22.1, 21.1

[56] References Cited

U.S. PATENT DOCUMENTS

| | | | |
|---|---|---|---|
| 4,435,759 | 3/1984 | Baum et al ............................... | 364/200 |
| 4,674,089 | 6/1987 | Poret . | |
| 4,691,316 | 9/1987 | Phillips . | |
| 4,847,805 | 7/1989 | Ishii et al. ........................... | 395/183.05 |
| 4,868,822 | 9/1989 | Scott et al. .......................... | 395/183.05 |
| 4,914,659 | 4/1990 | Erickson . | |
| 4,954,942 | 9/1990 | Masuda et al. ..................... | 395/183.05 |
| 4,989,207 | 1/1991 | Polstra ............................... | 395/183.05 |
| 5,073,968 | 12/1991 | Morrison .................................. | 395/500 |
| 5,263,143 | 11/1993 | Robinson et al. ....................... | 395/425 |
| 5,321,828 | 6/1994 | Phillips . | |
| 5,390,323 | 2/1995 | Newell et al. ...................... | 395/183.21 |
| 5,446,876 | 8/1995 | Levine et al. . | |
| 5,479,652 | 12/1995 | Dreyer . | |
| 5,615,357 | 3/1997 | Ball . | |
| 5,640,542 | 6/1997 | Whitsel et al. . | |
| 5,642,478 | 6/1997 | Chen et al. . | |
| 5,664,169 | 9/1997 | Dahlberg . | |
| 5,680,542 | 10/1997 | Mulchandani et al. . | |
| 5,689,694 | 11/1997 | Funyu ..................................... | 395/581 |
| 5,748,878 | 5/1998 | Rees .................................. | 395/183.14 |

*Primary Examiner*—Joseph E. Palys
*Attorney, Agent, or Firm*—Donald O. Nickey; Standley & Gilcrest

[57] ABSTRACT

A system which provides real-time code coverage data on a memory monitored by the system, the code coverage data providing information regarding accesses to the monitored memory, the monitored memory being connected to address lines and data lines, the system comprising: a code coverage memory, the code coverage memory having address inputs and data inputs, wherein signals on the address lines connected to the monitored memory are received at the address inputs of said code coverage memory; and a code coverage control circuit for providing predetermined code coverage data to the data inputs of the code coverage memory. In a preferred embodiment, the code coverage memory is comprised of multiple locations, each of the locations having a predetermined width, and where the code coverage control circuit is adapted to provide predetermined code coverage data in real-time concurrently with the accesses to the monitored memory. The code coverage data is comprised of predetermined bit patterns providing information on the accesses to the monitored memory, where the predetermined bit patterns may be varied for different tests run through the monitored memory. Additionally, in a preferred embodiment, the system is further comprised of: a trace memory, where the trace memory has address inputs and data inputs, and wherein signals on the address lines connected to the monitored memory are received at the data inputs of the code coverage memory for storage in the trace memory; and a trace control circuit in electrical communication with the address inputs of the trace memory, wherein the trace control circuit is adapted to output signals to the address inputs of the trace memory to change the location in the trace memory to which the signals on the address lines connected to the monitored memory are stored.

42 Claims, 16 Drawing Sheets

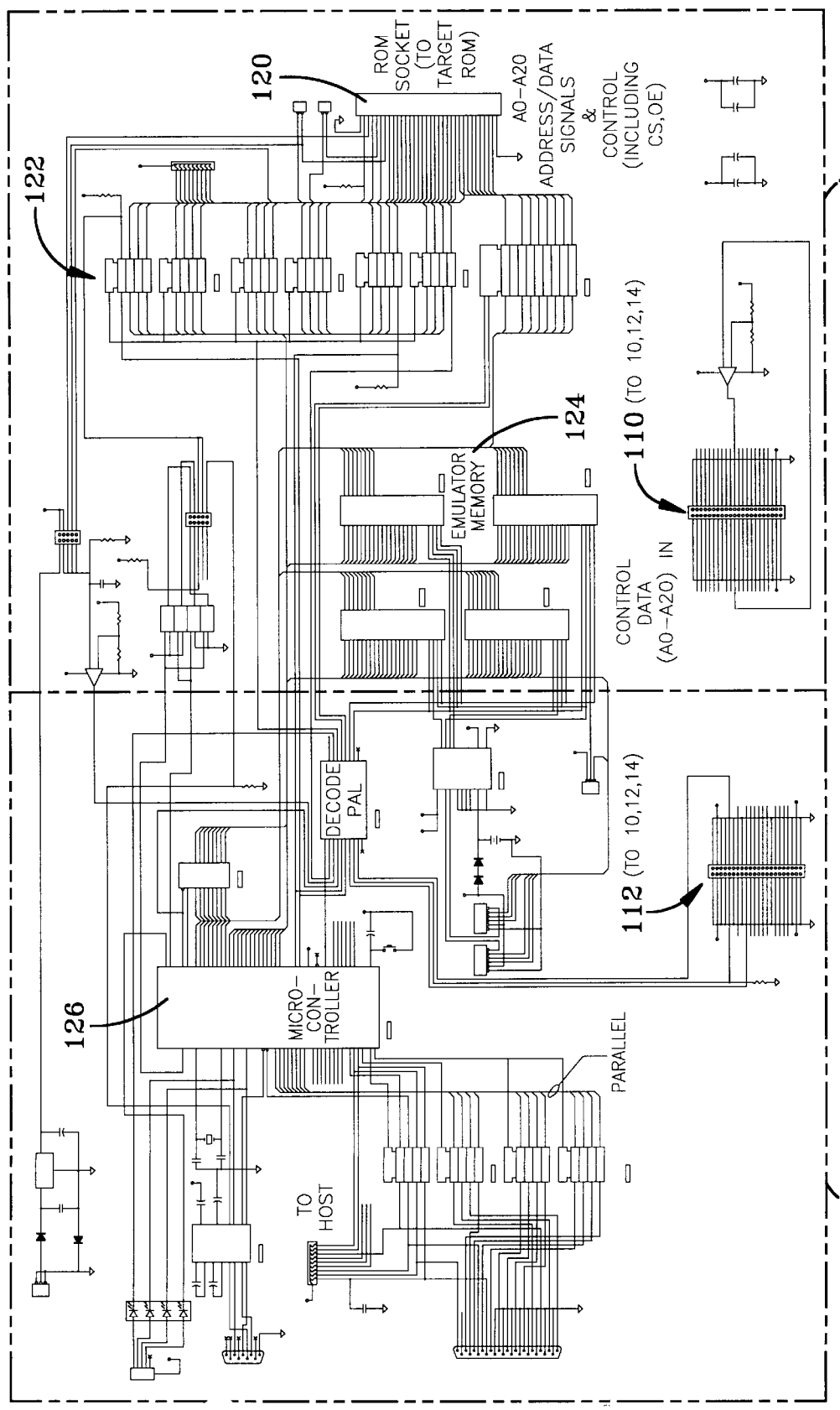

| USE COUNTER B BREAK | USE COUNTER A BREAK | BREAK | USE TRACE COUNTER | USE SKIP COUNTER | STOP TRACE | START TRACE | TRACE ALWAYS |

FIG-10

SYSTEM FOR PROVIDING REAL-TIME CODE COVERAGE

TECHNICAL FIELD

The present invention relates to the field of computer diagnostic and test systems, and more particularly, to a system for providing real-time code coverage data on a monitored memory bank.

BACKGROUND OF THE INVENTION

In today's digital world, where virtually any application may be implemented via digital electronic circuits, it is imperative to be able to efficiently design, test and diagnose software code prior to commercial implementation. It is also important to be able to efficiently diagnose and debug existing systems which are malfunctioning. Accordingly, it is known to monitor program code loaded in memory as it is being accessed and executed. This is preferably done by monitoring the signals present on the address lines (i.e., bus) or data lines connected to the memory being monitored. The data collected from monitoring the memory accesses can be grouped into two main categories:

1.) trace data; and
2.) code coverage data.

Trace data relates to information regarding the actual data present on the address lines and/or control lines, and/or data lines at any given point of program code access and execution. Trace data allows a "snap shot" of the signals present on the buses of the monitored system at any given point in time. By examining the trace data, the developer or tester may determine whether the system is providing the right signals on the buses at any given time.

Code coverage data relates to information summarizing the accesses to the monitored memory during program execution. Code coverage data allows developers and testers to determine which sections and locations of the memory (e.g., Read Only Memory, "ROM") are being accessed during program execution.

Known systems for obtaining trace data or code coverage data do not allow for the real-time collection of test data that provides information on test program execution paths. For example, see U.S. Pat. No. 5,321,828 which describes an in-circuit emulator designed to detect function calls to create a histogram and code coverage profile from that data. See U.S. Pat. No. 4,674,089 which describes a silicon based debugging system. Additionally, many of the code coverage methods are software based, often requiring special software "branch analysis" coding. For example, see U.S. Pat. No. 4,914,659 where the test code itself is specially coded with branch analysis code for the purpose of obtaining test data. These systems do not allow for the real-time collection of code coverage and trace data that allows use of user-defined, multi-bit, code coverage data.

Known diagnostic systems have, for example, been implemented with emulation circuits for testing program code loaded in an emulated ROM memory. Such ROM emulators have particular applicability in embedded controller systems (e.g., a microwave controller) where program code is loaded in ROM memory. When these embedded systems malfunction, they may be diagnosed by placing an emulated ROM chip into the ROM socket of the embedded "target" system and running tests through the emulated ROM. The emulated ROM, usually random access memory (RAM), may be loaded with program (test) data from a host computer system. Trace data and code coverage may be obtained from the running of the test program to determine problems in the target system. The efficiency of these emulation/diagnosis systems greatly reduce the cost of producing program code, hardware systems, and diagnosing malfunctioning existing systems. Although code coverage, per se, is not a new innovation, real-time code coverage, where memory access data is collected in a memory chip in real-time and where the code coverage data provides rich execution path information, would be an advancement in the art. The present invention allows the tracing of code execution paths by storing a user-defined, multi-bit pattern into a "code coverage" memory. The code coverage data is collected in real-time and stored for further analysis and processing. By using multiple bit code coverage data, the user may vary the bit patterns of the code coverage data for different test runs to "paint" different execution paths in the code coverage memory.

The present invention also provides for real-time trace of a monitored memory (e.g., an emulated memory) for analyzing bus activity. In the preferred embodiment of the present invention, the address lines of the emulation circuit are used as inputs to both the code coverage memory and trace memory.

Another feature of the present invention is that the code coverage memory (i.e., memory used to store code coverage data) may alternatively be used for fine trace control. In other words, in the "fine trace mode", fine trace data stored in the code coverage memory is read (as opposed to being written as in the "code coverage mode") upon which a fine trace control circuit processes the retrieved fine trace data to control tracing functions. Accordingly, the present invention provides a versatile diagnostic system that, unlike known systems:

1.) allows for real-time code coverage (i.e., information regarding memory accesses);

2.) allows for the use of a separate code coverage memory where code coverage data is stored in real-time;

3.) allows for the tracing of execution paths of tested programs by storing user defined, multiple-bit patterns into the code coverage memory;

4.) allows for real-time trace;

5.) allows for fine trace control using the code coverage memory;

6.) performs all of the above functions in conjunction with an emulated circuit, where an emulated ROM is monitored according to the present invention;

7.) allows for code coverage read and trace data dump for further processing by a host computer; and 8.) allows for the collection of informative code coverage and trace data in real-time for efficient design, testing, and diagnosis of digital systems and program code.

SUMMARY OF THE INVENTION

The present system allows for the collection of real-time code coverage data on a memory monitored by the system, the code coverage data providing information regarding accesses to the monitored memory, the monitored memory being connected to address lines and data lines, the system comprising: a code coverage memory, the code coverage memory having address inputs and data inputs, wherein signals on the address lines connected to the monitored memory are received at the address inputs of the code coverage memory; and a code coverage control circuit for providing predetermined code coverage data to the data inputs of the code coverage memory. In a preferred embodiment, the code coverage memory is comprised of multiple locations, each of the locations having a predetermined width, and where the code coverage control circuit is adapted to provide predetermined code coverage data in real-time concurrently with the accesses to the monitored memory. The code coverage data is comprised of predetermined bit patterns providing information on the accesses to the monitored memory, where the predetermined bit patterns may be varied for different tests run through the monitored memory.

Additionally, in a preferred embodiment, the system is further comprised of: a trace memory, where the trace memory has address inputs and data inputs, and wherein signals on the address lines connected to the monitored memory are received at the data inputs of the trace memory for storage in the trace memory; and a trace control circuit in electrical communication with the address inputs of the trace memory, wherein the trace control circuit is adapted to output signals to the address inputs of the trace memory to change the location in the trace memory to which the signals on the address lines connected to the monitored memory are stored. In an alternative embodiment, trace data may be collected on the data lines of the monitored memory and/or other external data signals of a target system (e.g. RAM access, control signals).

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIGS. 8A–8C illustrate an example circuit schematic illustrating one embodiment of an emulation circuit used in conjunction with the system of the present invention;

FIG. 10 illustrates example fields of one embodiment of a fine trace control register.

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
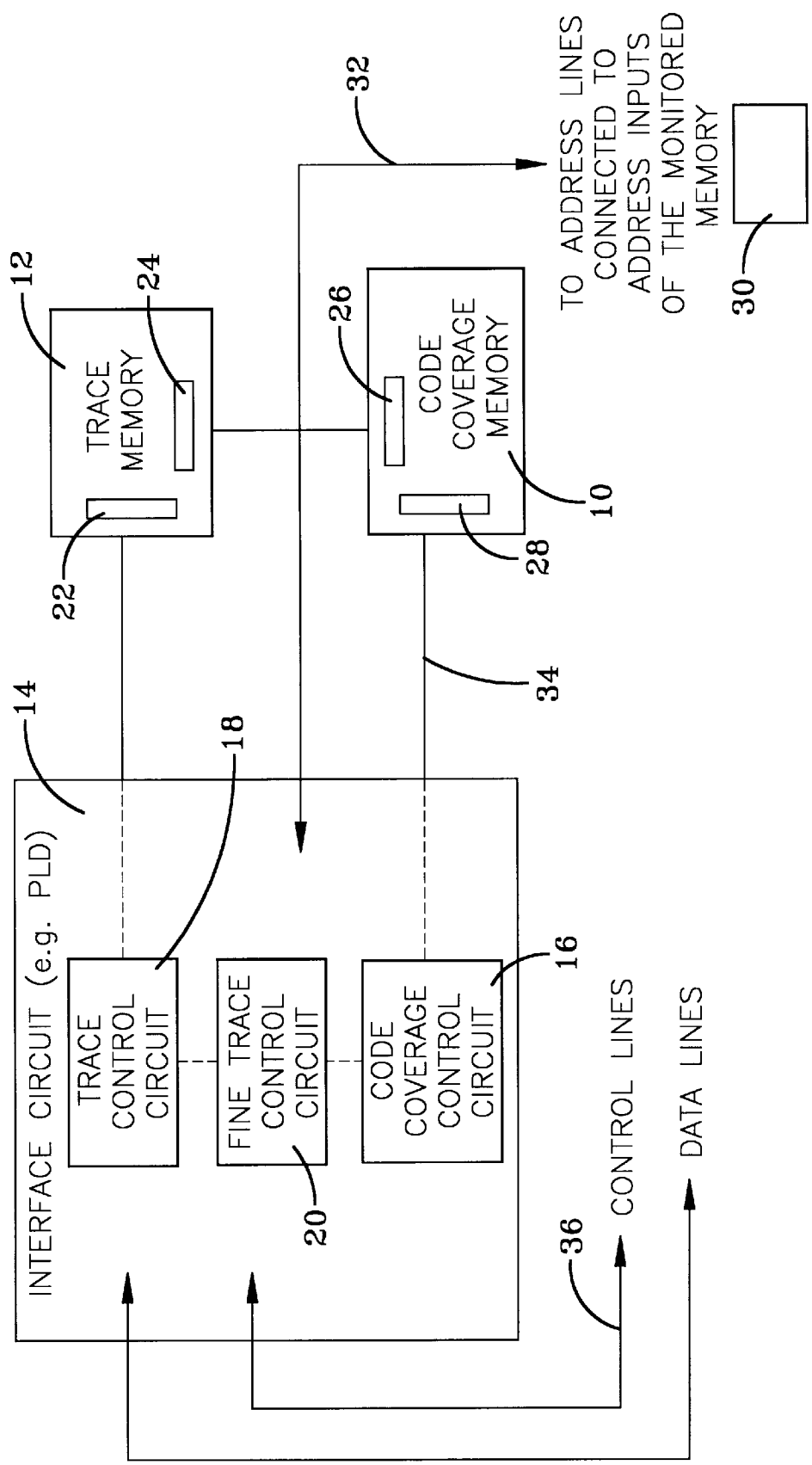
FIG. 1 illustrates a block diagram of the main components of the code coverage system of the present invention.

FIG. 1 illustrates a block diagram of the main components of the code coverage system of the present invention. The present invention is comprised of a code coverage memory 10, a trace memory 12, and an interface circuit 14. The interface circuit is further comprised of a code coverage control circuit 16, a trace control circuit 18, and a fine trace control circuit 20. Again, "code coverage memory" is the memory circuit used to store code coverage data as previously discussed. "Trace memory" is the memory circuit used to store trace data as previously discussed.

The trace memory 12 and the code coverage memory 10 are preferably RAM circuits having a bit width that may vary based on the width of the address locations of the memory to be monitored. The word capacity (memory capacity) of the trace memory may be user dependent and the code coverage memory capacity preferably corresponds to the memory being monitored. The memory to be monitored (i.e., "monitored memory") is the memory for which the trace data and code coverage data is collected. In one embodiment, which will be discussed in more detail below, the monitored memory is an emulated memory of an emulation circuit used to diagnose a target system. In one embodiment the code coverage memory is 8 bits wide.

A memory chip generally has data inputs and address inputs. Address signals received at the address inputs are used to address the memory to store data received at the data inputs at a specified location in the memory (i.e. "addressing the memory"). Accordingly, the trace memory 12 has address inputs 22 and data inputs 24. The code coverage memory 10 also has address inputs 26 and data inputs 28.

The data inputs 24 of the trace memory 12 and the address inputs 26 of the code coverage memory are connected to a bus that is electrically connected to receive address signals used for addressing a monitored memory 30 (again in one embodiment data signals from a monitored memory and/or external signals may also be monitored by the trace circuit). Hereinafter, if a bus is used to carry address signals, the bus will be referred to as "address lines" or "address bus", if a bus is used to carry data signals, the bus will be referred to as "data lines" or "data bus."

Accordingly, as illustrated in FIG. 1, it is preferred that the address bus 32 connected to the monitored memory 30 be in electrical communication with both:

1.) the data inputs 24 of the trace memory 12; and
2.) the address inputs 26 of the code coverage memory 10.

In the preferred embodiment, a buffer circuit 56 isolates the code coverage and trace memories 10, 12 with the monitored memory 30 (buffer circuit not shown in FIG. 1). Accordingly, the buffer circuit 56 can isolate the signals on the address bus 32 so that data stored in the trace memory 12 and code coverage memory 10 may be read without interference from the address signals on the address bus 32. For example, when a host computer wants to read the code coverage data stored in the code coverage memory 10 for processing, the buffers 56 are turned off to isolate the code coverage memory 10 from the monitored memory address lines 32 and a counter in the interface circuit 14 is preferably used to drive the addressing of the memory so as to read the locations as desired (the locations may also be written to in a test mode).

As the monitored memory 30 is addressed by the signals on the address bus 32, the signals present on the address bus 32 also act to address the code coverage memory 10. Concurrently, the signals on the address lines 32 of the monitored memory 30 are also inputted into the trace memory 12 via the data inputs 24 of the trace memory 12 (as trace data).

As the code coverage memory 10 is addressed, a predetermined bit pattern (i.e., code coverage data) is inputted into the addressed location of the code coverage memory 10 via data bus 34 (accordingly, although the same address locations in the monitored memory 30 and the code coverage memory 10 are being concurrently addressed, the code coverage memory 10 gets written while the monitored memory 30 is generally read). This predetermined bit pattern may be changed according to the user, e.g. for different tests, to paint an execution path of the program executed on the monitored memory 30. This code coverage information may be obtained as real-time data and provides information that known diagnosis systems do not provide.

As discussed above, the signals on the monitored memory's address bus 32 are inputted into the data inputs 24 of the trace memory 12 (as trace data). Preferably, a counter circuit in the trace control circuit 18 provides the location in the trace memory 12 (i.e. trace address) to which the signals are to be stored. In the preferred embodiment, this trace data is continuously arriving at the data inputs 24 of the trace memory 12 (as long as the buffers 56 are ON). If the trace data is to be stored, the trace control circuit 18 may change the trace address so that the trace data will be stored at the previous trace address and where the next pattern of trace data will be stored at the new trace address. If the trace data is not to be stored, the trace counter circuit 64 will not change the trace address and the new trace data (i.e. the next address on the address lines 32 of the monitored memory 30) replaces the old trace data at the same location in the trace memory 12 (see the timing diagram of FIGS. 9A9–C).

Figure 9A:
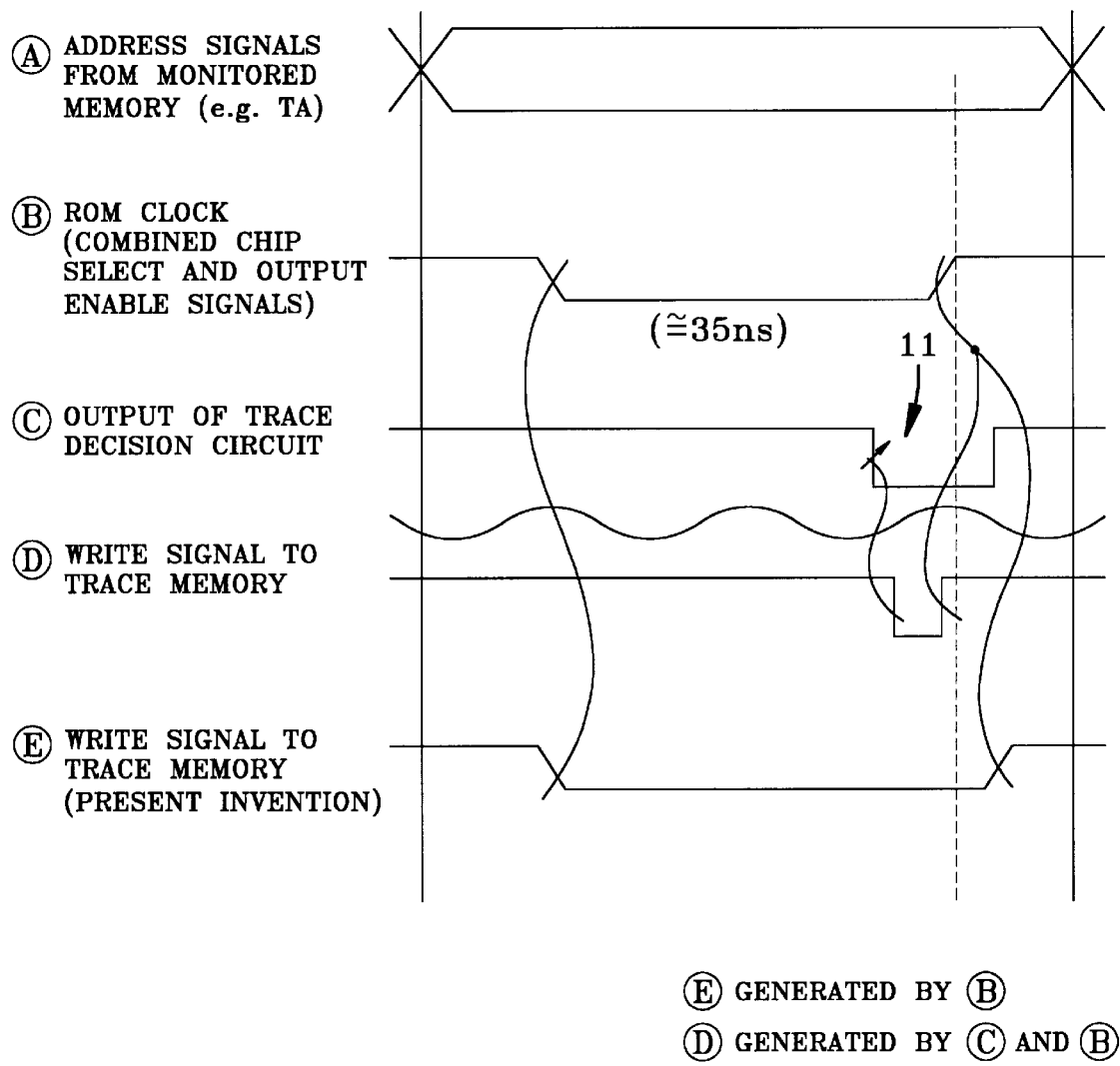
FIGS. 9A–9B illustrate sample timing diagrams illustrating the timing of the trace functions of the present invention.
Figure 9B:
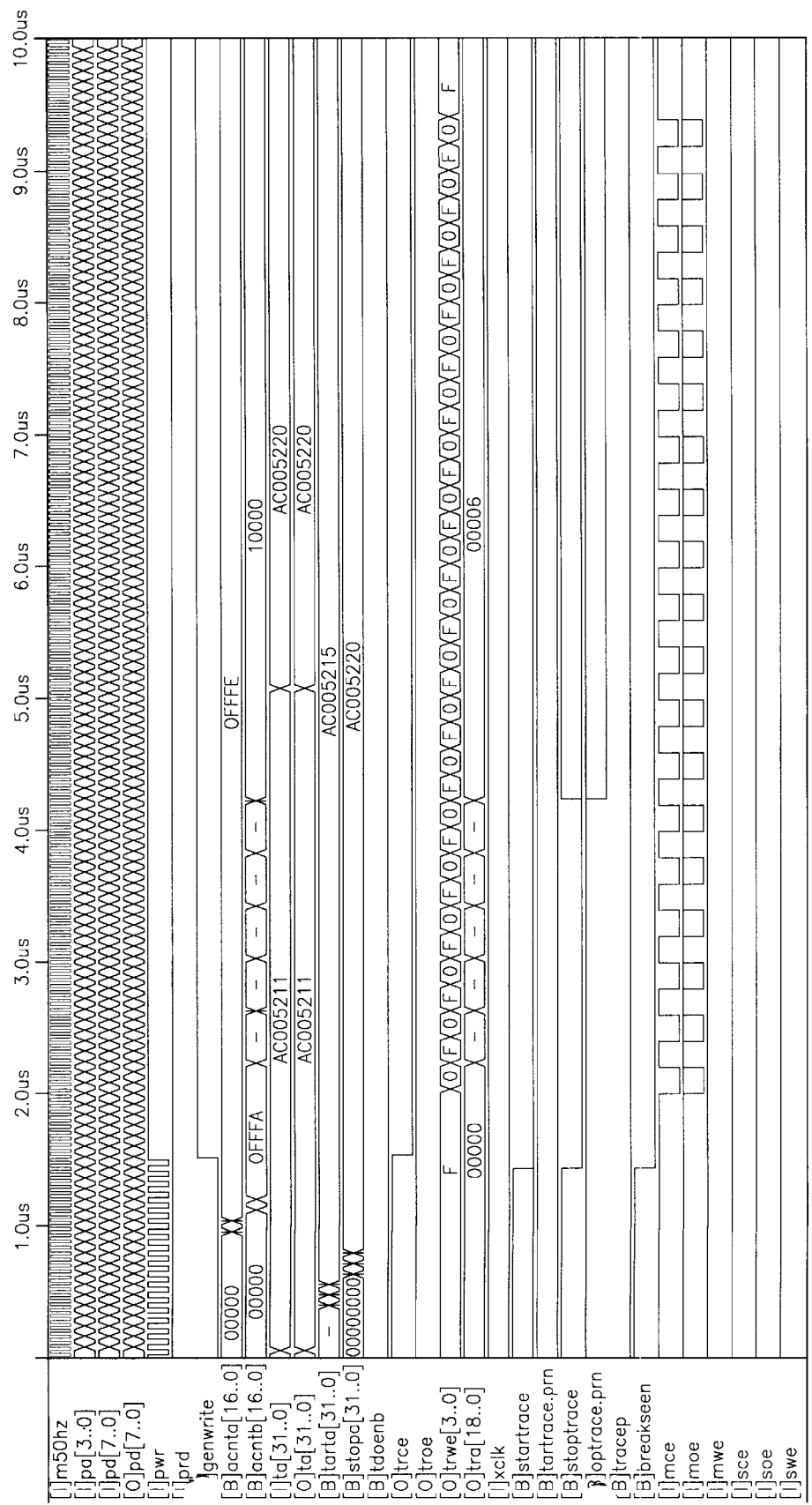

In other words, in the system of the present invention, the write signal to the trace memory is always enabled. FIG. 9A illustrates a timing chart illustrating signals present on the trace address lines (e.g., "TA"), ROM clock (e.g., "CS" and "OE"), trace memory write, and the output of the trace control circuit (e.g. decision comparators within the PLD). As illustrated, signal A represents the address signals sent to the address inputs of the monitored memory. Subsequently to the addressing of the memory, predetermined control signals, e.g. chip select "CS" and output enable "OE", are used to latch the data from the monitored memory to the data lines connected to the monitored memory (signal B). These controls signals may be used as a "ROM" clock that notifies the interface circuit 14 that an access to the monitored memory has been made. Subsequently, the interface circuit 14, which receives the target address signals, makes a decision as to whether the address data is to be stored into the trace memory 12. This decision is preferably dependent on the values of the address signals, the programming of the interface, applicability of fine trace data, and the control signals received by the interface circuit 14. If the data is to be stored in trace, a "trace decision circuit" (e.g., a comparator) within the interface circuit 14 outputs a predetermined signal (signal C). The decision whether to store the trace data takes approximately 28 ns in one embodiment. Accordingly, if a write signal is to sent to the trace memory to store the data in the trace memory 12 (signal D), the system only has 7 ns to latch the trace data into the trace memory 12 (i.e. 35 ns subtracted by 28 ns). This 7 ns time period is not a sufficient time to instruct the trace memory to latch and store the data. Accordingly, to solve this problem, the system of the present invention is designed so that in the trace mode, the write input to the trace memory is always enabled (signal E) and where the output of the "trace decision circuit" is used to increment a counter in the interface circuit 14 which acts as the input to the address inputs of the trace memory (i.e., the portion of signal C at 11 is used to initiate incrementation of the counter). In this embodiment, the storing of the trace data is not dependent on the duration of the write enable signal to the trace memory. FIG. 9B also illustrates a timing chart of one example embodiment of the present system.

As the monitored memory 30 is being accessed (e.g., by a target system), corresponding clocking signals are sent to the interface circuit 14 via the control lines 36 (e.g. chip select and output enable). These clocking signals are used as timing signals in controlling the trace and code coverage functions of the present invention, as discussed above.

The interface circuit 14 may be implemented by programming a programmable logic device (PLD). The PLD generally includes a group of logic circuits (see FIG. 7) for performing the functions of the trace control and code coverage control discussed above. Accordingly the trace control circuit 18 and the code coverage control circuit 16 may be implemented via the same PLD. A fine trace control circuit 20 is also implemented via a PLD according to a preferred embodiment of the present invention. During fine trace control 20, the code coverage memory 10 is read instead of written. The read data, previously loaded into memory 10 by a host computer, indicates what fine trace control is to take place. For example, the bit pattern read from the code coverage memory 10 may indicate trace, break, count event, or other fine trace actions (see FIG. 10). More particularly, the code coverage memory 10 is used for fine trace control by setting a bit in a control register within the interface 14. The fine trace control circuit 20 processes the retrieved fine trace data and then controls the trace control circuit 18 based on the retrieved fine trace data.

The improved code coverage system of the present invention allows for real-time, hardware implemented, code coverage, where user defined, multi-bit bit patterns may be used to provide information on monitored memory access and execution paths. Additionally, the code coverage memory of the present invention may alternatively be used for fine trace control. The present invention provides software developers and diagnostic testers with detailed information about monitored program execution allowing for more efficient system design and testing.

The following discussion provides a description of one example application of the code coverage system of the present invention. The following discussion describes the code coverage system of the present invention in use in conjunction with an emulation circuit. Emulation circuits are comprised of programmable emulators (e.g., microprocessor emulation or ROM emulation). ROM emulators have memory which is programmed for emulating the ROM in a microprocessor-based system. In ROM emulation systems, the emulated ROM may be connected to the ROM socket of the target system being tested. Accordingly, the target system, specifically the microprocessor, accesses instructions from the emulated ROM (e.g. through the ROM socket). The emulated ROM may be programmed with specific instructions to be run by the target processor. As these instructions are being executed by the target system, diagnostic test information may be gathered for analysis by the system of the present invention.

Accordingly, the real-time code coverage and trace system of the present invention may be used in conjunction with an emulation circuit. The emulated memory in the emulation circuit is the memory being monitored (i.e., the monitored memory 30) by the trace and code coverage system of the present invention. In other words, as the emulated memory is being addressed by the target system and as the data is read by the target, the trace memory 12 and code coverage memory 10 is being loaded with trace data and code coverage data, respectively. Accordingly, data representing the signals present on the buses, information on accesses to the emulated memory space and execution paths of the emulated memory access may be stored for further processing and diagnosis. This information provides rich data which may be used to assist in system design and/or to help diagnose system malfunction or inefficiency.

Figure 2:
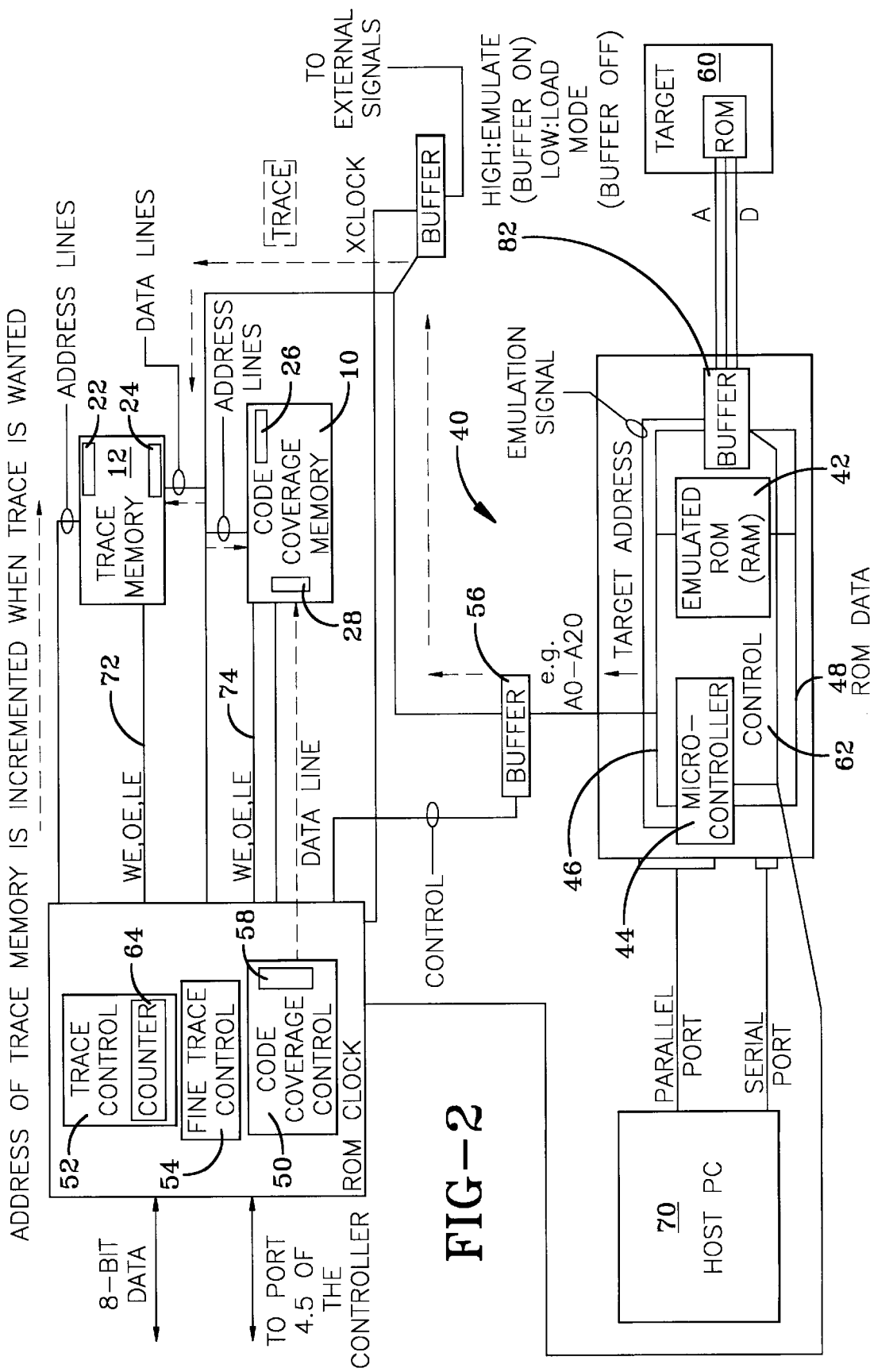
FIG. 2 illustrates a block diagram of the main components of the code coverage system of the present invention with dotted lines showing trace and code coverage data paths.
Figure 8A:
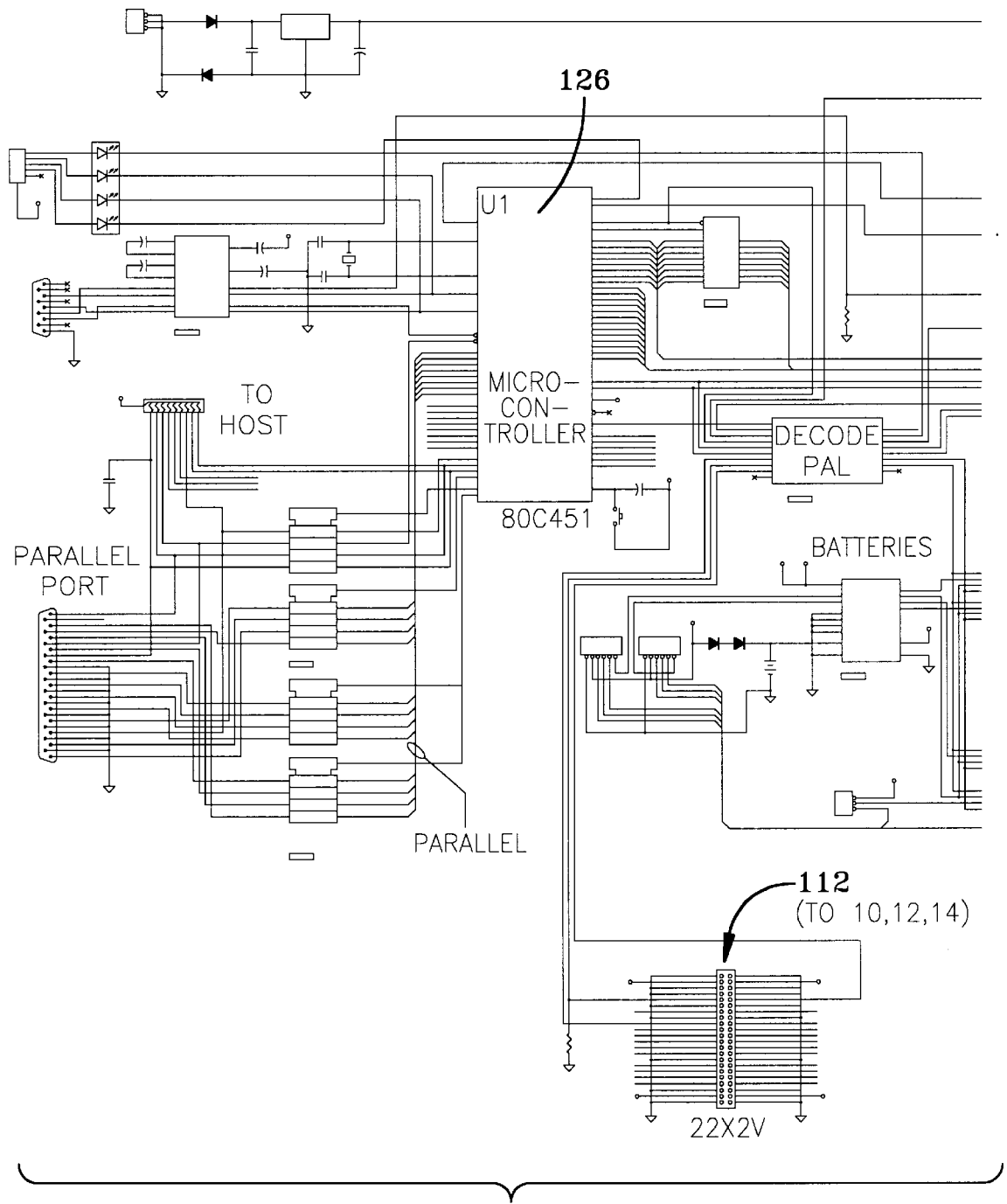
Figure 8B:
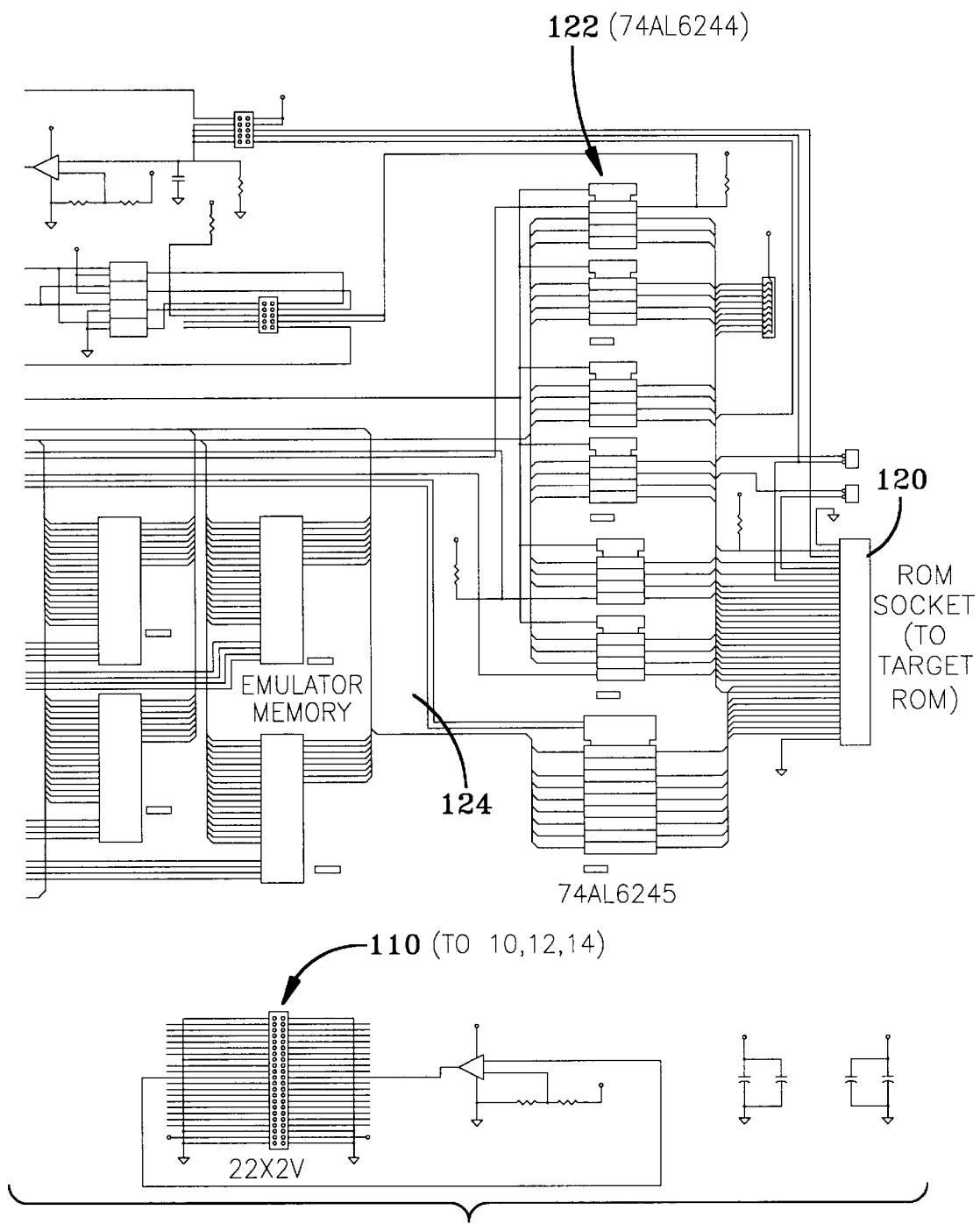

FIG. 2 illustrates a block diagram of the main components of the code coverage system of the present invention in conjunction with an emulation circuit 40, with dotted lines showing trace and code coverage signal paths (FIGS. 6A–6D in conjunction with FIGS. 8A–8C illustrate an example detailed circuit schematic of one embodiment of the code coverage system of the present invention in use with a ROM emulation circuit). The system is preferably comprised of: an emulated memory 42; a controller circuit 44 in electrical communication with the emulated memory 42; address lines 46 connected to the emulated memory 42; data lines 48 connected to the emulated memory 42; and a code coverage memory 10. The code coverage memory 10 has address inputs 26 and data inputs 28, and wherein signals on the address lines 46 of the emulation circuit 40 are received at the address inputs 26 of the code coverage memory 10. A code coverage control circuit 50 is adapted to provide predetermined user defined code coverage data to the data inputs 28 of the code coverage memory 10.

As depicted in FIG. 2, the emulation system having real-time code coverage is configured with a microcontroller-base emulation circuit 40. In the preferred embodiment, the microcontroller 44 communicates with the host computer 70 and controls many of the activities and states of the emulated memory space 42 and other special circuits within the emulation circuit 40. In one embodiment, the microcontroller has multiple ports that are assigned to different functions (e.g. communicating with the trace and code coverage and fine trace control circuits 50, 52, 54, communicating with the host system 70, and talking to the emulated memory 42). The target system 60 is preferably connected to the emulation circuit 40 by an address line 46, a data line 48, and a control line 62 (e.g. the ROM socket).

In the embodiment shown in FIG. 2, the emulation circuit 40 is the circuit that serves as the main interface between the host system 70, the target system 60, and the trace and code coverage systems. The host system 70, preferably a PC, can be used to instruct the controller 44 when to perform code coverage, when to perform trace, when to read trace or to read code coverage data. The host system 70 can also be used to program the emulated memory 42. The host system 70 also tests the emulated memory, code coverage memory, and trace memory. Lastly, the host system 70 may be used to perform detailed analysis on the trace and code coverage data retrieved from the trace memory 12 and the code coverage memory 10.

The interfaces between the main components of the emulation system of FIG. 2 will be discussed in greater detail in the following discussion.

As illustrated in FIG. 2, as the target system 60 addresses the emulated memory 42 through the address lines 46, the signals on the address lines 46 are used to address the code coverage memory 10 while predetermined code coverage data is loaded into the data inputs 28 of the code coverage memory 10 in real-time. It is preferred that the emulation system of FIG. 2 have a first buffer circuit 56 for interfacing the code coverage memory 10 and the emulation circuit 40. The first buffer circuit 56 allows signals from the address lines 46 of the emulation circuit 40 to be sent to the code coverage memory 10 when in a "code coverage mode" and wherein the first buffer circuit 56 isolates the address lines 46 of the emulation circuit 40 from the code coverage memory 10 when access to the code coverage memory 10 is initiated by the host system 70 (i.e. for "code coverage read mode").

In the preferred embodiment of the emulation system of the present invention, the predetermined code coverage data is passed to the code coverage memory 10 via data loaded into a register 58 in the code coverage control circuit 50. The code coverage control circuit 50 may be implemented by programming a programmable logic device. The code coverage control circuit 50, in the preferred embodiment, is in electrical communication with a control bus 62 used to communicate control signals from the target system 60 and the emulation system 40. For example, the "chip select signal" and/or the "output enable signal" from the target system 60 may be used as control signals to the code coverage control circuit 50 which may be used to time the loading of the code coverage data into the code coverage memory 10.

In one embodiment, the code coverage memory is 8 bits wide. In such an embodiment, the data loaded in the register 58 may be varied for different tests of the emulated memory 42. For example, hexadecimal "ff" may be loaded from the register 58 to the code coverage memory 10 in one test, and hexadecimal "00" may be loaded in another test. In this way, the data stored in the code coverage memory 10 will indicate which locations were accessed for each test (e.g., by reading the code coverage data and looking for specific patterns of stored data). The code coverage memory may be mapped into different segments (e.g., up to four) to analyze only portions of the memory. See the more detailed discussion on mapping the memory below in the detailed discussion of the example emulation circuit of FIGS. 8A–8C.

In addition to the code coverage memory 10, in a preferred embodiment of the emulation system of FIG. 2, the system is further comprised of a trace memory 12 for storing trace data of the emulated memory 42. As discussed, the trace memory 12 has address inputs 22 and data inputs 24, where the data inputs 24 of the trace memory 12 receive signals from the address lines 46 of the emulation circuit 40 (i.e., the target system 60 address signals become the data input for the trace memory 12). In another embodiment, the data signals from the monitored memory may be traced into the trace memory 12 via external connectors (i.e. not via the ROM socket).

Again, as the target system 60 is addressing the emulated memory 42 and reading the data, the trace memory 12 is adapted so that a "trace address" counter 64, preferably part of the trace control circuit 52, provides an address to the trace memory address inputs 22.

The first buffer circuit 56 allows signals from the address lines 46 of the emulation circuit 40 to be sent to the trace memory 12 when in a "trace mode" and wherein the buffer circuit 56 isolates the address lines 46 of the emulation circuit 40 from the trace memory 12 when access to the trace memory 12 is initiated (e.g. for trace data dump).

As discussed above, the trace control circuit 52 is adapted to provide signals to the address inputs 22 of the trace memory 12. The signals provided to the address inputs 22 of the trace memory 12 determine the location (i.e. address) in the trace memory 12 where the signals on the address line 46 of the emulation circuit 40 are to be stored. In a preferred embodiment, a counter circuit 64 is implemented to increment the address signals to address the next location in the trace memory 12. Accordingly, if a specific address (of emulated memory 42) is not to be traced, the counter 64 will not be incremented allowing the subsequent address signals present on the address line 46 to be recorded in the trace memory location (i.e. the counter circuit 64 increments the memory 12 from a first address to a second address when trace data is to be retained in the first address). See the timing diagrams of FIGS. 9A–9B.

Additionally, in a preferred embodiment of the emulation system of FIG. 2, the system is adapted to allow the use of the code coverage memory 10 to store "fine trace control" data. During fine trace control, the code coverage memory 10 is read instead of written. The read data, preferably loaded by the host system 70, indicates what action is to be taken with regard to the trace (e.g., trace, skip trace, break, count event, etc.). The fine trace control circuit 54 may be implemented via a programmable logic unit, and is adapted to retrieve the fine trace control data from the code coverage memory 10 so that the system may continue trace in real-time. In other words, in the fine trace mode, when the target system 60 addresses a location of the emulated memory 42, the address signal on the address line 46 is received at the data inputs 24 of the trace memory 12 and address inputs 26 of the code coverage memory 10. Upon receiving the address signals at the address inputs 26 of the code coverage memory 10, the data stored in the code coverage memory 10 corresponding to that location is read into a register 58. The fine trace control circuit 54 then uses that data loaded into the register 58 to actuate any fine trace control actions. For example, if the fine trace data indicated a "skip trace" (e.g., by setting an appropriate bit in the register), the fine trace control circuit 54 may instruct the trace control circuit to skip trace (e.g. by not incrementing the trace counter 64). The fine trace control circuit 54 may also be adapted to send an interrupt signal to a target processing system 60 to stop operation when a predetermined fine trace control data pattern is retrieved from the code coverage memory 10. See example register with fine trace data fields illustrated in FIG. 10.

The fine trace control circuit 54 may be configured with/as comparators, and/or event counters, with appropriate registers depending on the fine trace features provided by the particular system. See the discussion below regarding the example circuit and HDL code.

The dotted lines of FIG. 2 illustrate the data path of the address signals present on the address lines 46 of the emulation circuit 40 and the data path of the trace address input and code coverage data input. In a trace mode, the write enable input WE is activated via the control line 72. In code coverage mode, the write enable input WE of the code coverage memory 10 is activated via control line 74. As discussed, the host system 70 may also read or write the code coverage memory 10 and the trace memory 12. The buffer circuit 56 is turned off during the host access modes so that the address lines 46 of the emulation circuit 40 are isolated from the trace memory 12 and code coverage memory 10.

Figure 3:
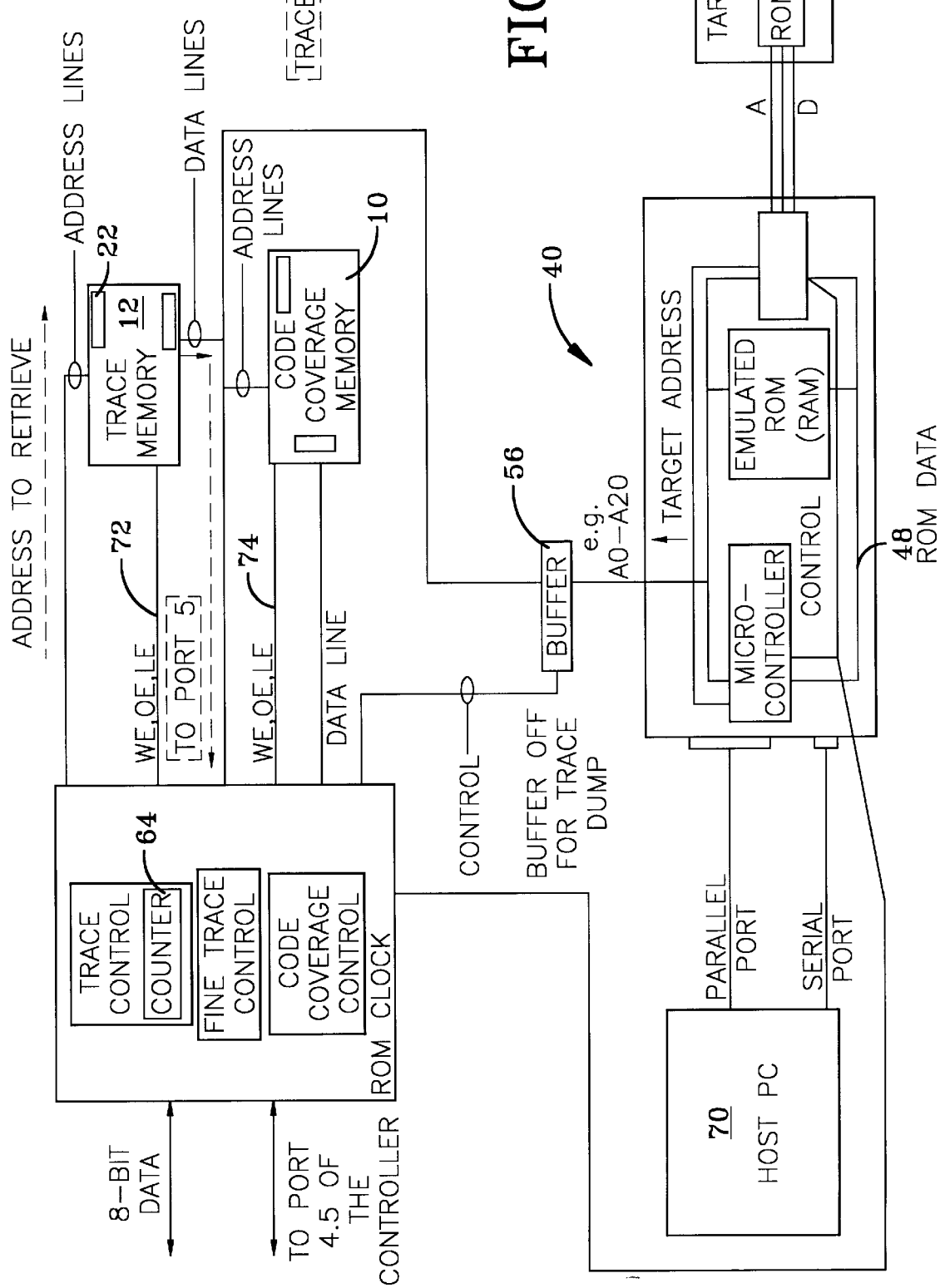
FIG. 3 illustrates a block diagram of the main components of the code coverage system of the present invention with dotted lines showing trace dump data paths.

FIG. 3 illustrates a block diagram of the main components of the code coverage system of the present invention with dotted lines showing trace dump data paths. The buffer 56 is turned off, and the output enable input OE (Read) of the trace memory 12 is activated to read the data from the trace memory 12 where it may be transferred to the host system 70 (e.g., by sending the data to a controller port of the emulation circuit 40, e.g. port 4, 5 of the circuit of FIG. 5.) Again, a counter circuit 64 may be used to address the trace memory 12 to the locations to be read.

Figure 4:
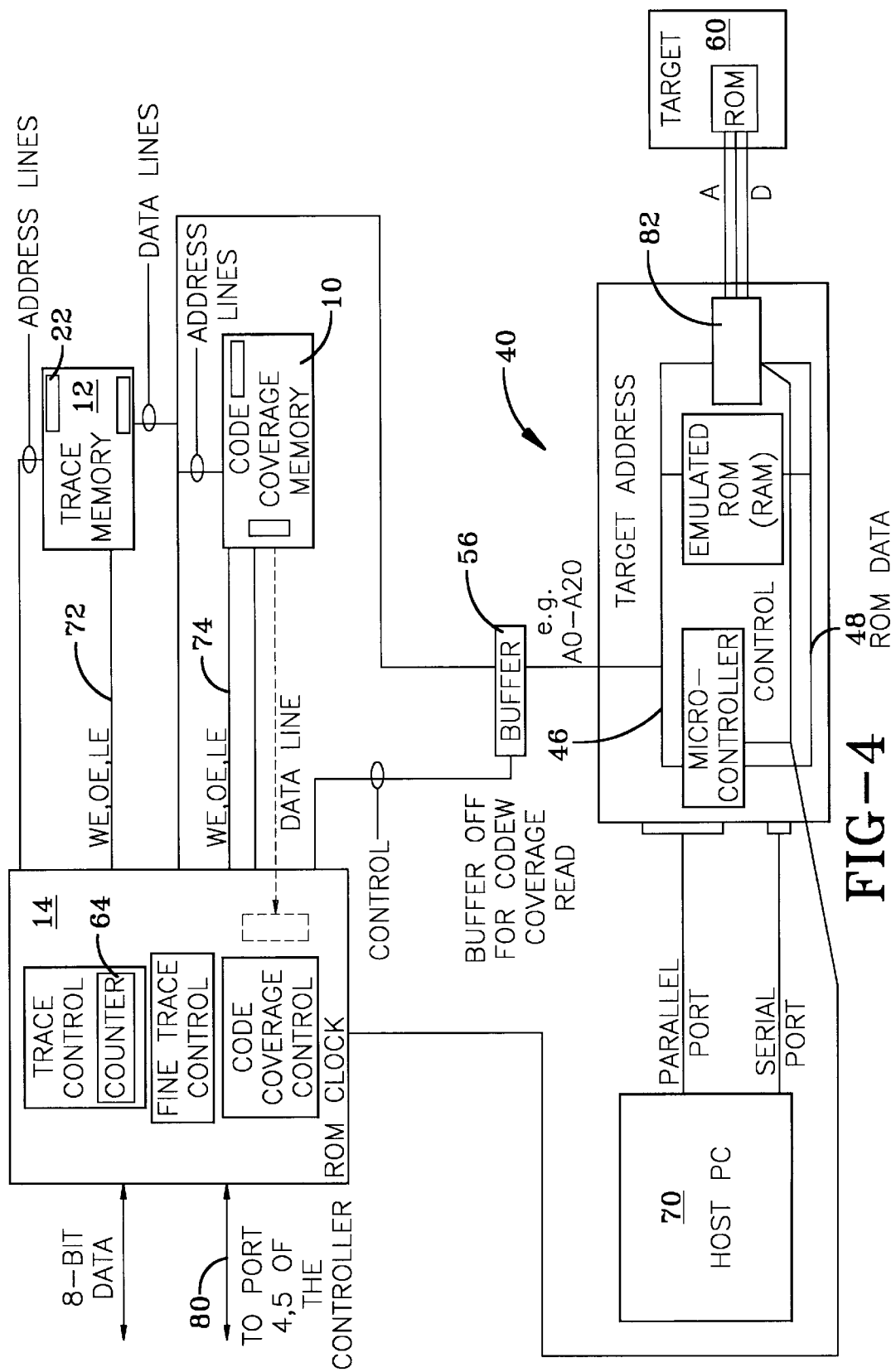
FIG. 4 illustrates a block diagram of the main components of the code coverage system of the present invention with dotted lines showing code coverage read data paths.

Similarly, FIG. 4 illustrates a block diagram of the main components of the code coverage system of the present invention with dotted lines showing code coverage read data paths. The buffer 56 is turned off, and the output enable input OE (Read) of the code coverage memory 10 is activated to read the data from the code coverage memory 10 where it may be transferred to the host system 70 (a counter in the interface circuit 14 provides address signals to the code coverage memory).

In summary, the interfaces of one embodiment of the emulation system of FIG. 2 (as embodied in FIGS. 8A–8C) are described in the following paragraphs:

a.) the host system 70 preferably communicates with the controller 44 over a parallel and/or serial data link. The parallel data link is preferably the parallel port (LPT) of a PC and the serial link is preferably the serial port (COM). The user can connect the controller 44 via either of the ports to the host 70. These links preferably terminate into the parallel and the serial ports on the emulation circuit 40.

b.) the controller 44 preferably uses 3 ports to talk to the emulated memory 42. The controller 44 moves data to and from the emulated memory 42 to the host 70 and makes the memory 42 available to the target (for emulation) or the host 70 (for loading).

c.) the controller 44 uses a port as a bi-directional data bus (e.g. Port 5 in the example schematic of FIG. 8) and another port as a control bus 80 to communicate with the trace memory 12 (e.g. Port 4 in the example schematic of FIG. 8). The trace control circuit 52 is preferably implemented as a set of control and status registers which allow the controller 44 to select and read or write these registers via its control 80 and data buses.

d.) the controller 44 uses the same data bus and control bus 80 as c.) above to talk to another set of registers to control and manage the code coverage memory 10.

e.) the emulation circuit 40 is interface to the target system 60 with a second buffer circuit 82. The buffer circuit 82 is turned ON when in an emulation mode and OFF when in a data load mode.

Figure 5:
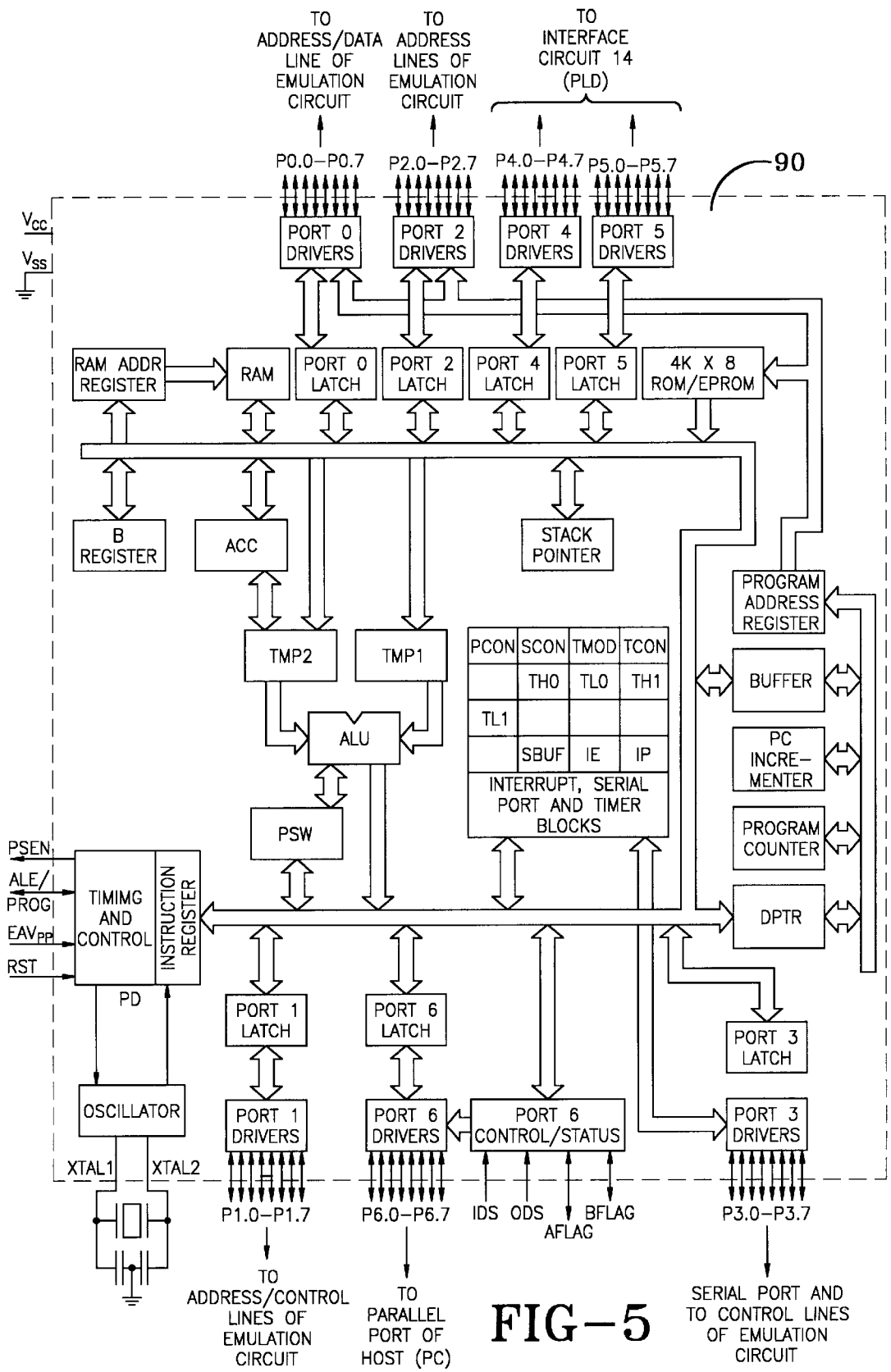
FIG. 5 illustrates a block diagram of one example of a microcontroller (Phillips) that may be used as the controller in the emulation system of FIG. 2.

FIG. 5 illustrates a block diagram of one example microcontroller (Phillips 87C451) that may be used as the controller 44 in the emulation system of FIG. 2. Although the following discussions of FIG. 5 and FIGS. 6A–6D and FIGS. 8A–8C relate to a specific circuit implementation of the system of FIG. 2, it is understood that other implementations may be configured with different components (e.g., different controllers) without departing from the spirit of the invention.

The Phillips 87C451 controller 90 is a CMOS single chip microcontroller. The controller 90 has seven 8 bit input/output (I/O) ports, four I/O control lines, an internal 4k×8 EPROM, a 128×8 RAM, two 16 bit counters, a serial port, and on-chip oscillator and clock circuits (see FIG. 5.) The Phillips controller 90 has the ability to address external memory (64k ROM and 64k RAM). In one example embodiment of the system of FIG. 2, as illustrated in FIGS. 5, 6 and 8, the seven 8 bit I/O ports are connected to:

Port 0: data and address lines 48 of the emulation circuit 40 (multiplexed);

Port 1: address lines 46 of the emulation circuit 40 (8 lines) (5 bits for extra address lines A16–A20, 3 bits for control signals);

Port 2: address lines 46 of the emulation circuit 40 (8 lines);

Port 3: control lines 62 of the emulation circuit 40 and serial port;

Port 4: to the interface circuit 14 (programmable logic device);

Port 5: to the interface circuit 14 (programmable logic device);

Port 6: to the parallel port of the host system 70.

Details of these interfaces will be described in more detail below.

FIGS. 6A–6D illustrate an example circuit schematic of the connections between the trace memory circuit 92, code coverage memory circuit 94, and an example programmable logic unit 96 implemented with code trace control circuits, trace control circuits, and fine trace control circuits. The connectors to the emulation circuit illustrated in FIG. 8 are also shown at 110 and 112.

In the example circuit of FIGS. 6A–6D, the emulated ROM and target memory has 21 address lines (these address signals are inputted to the trace memory 92 and code coverage memory 94 via bus lines 98, designated as TA0–TA20 in the figures, however a total of 32 lines, lines TA0–TA31, are inputted as trace data, some of the signals being provided externally from the emulation circuit). It is appreciated that in other embodiments, the size of the emulated memory may vary.

Figure 6A:
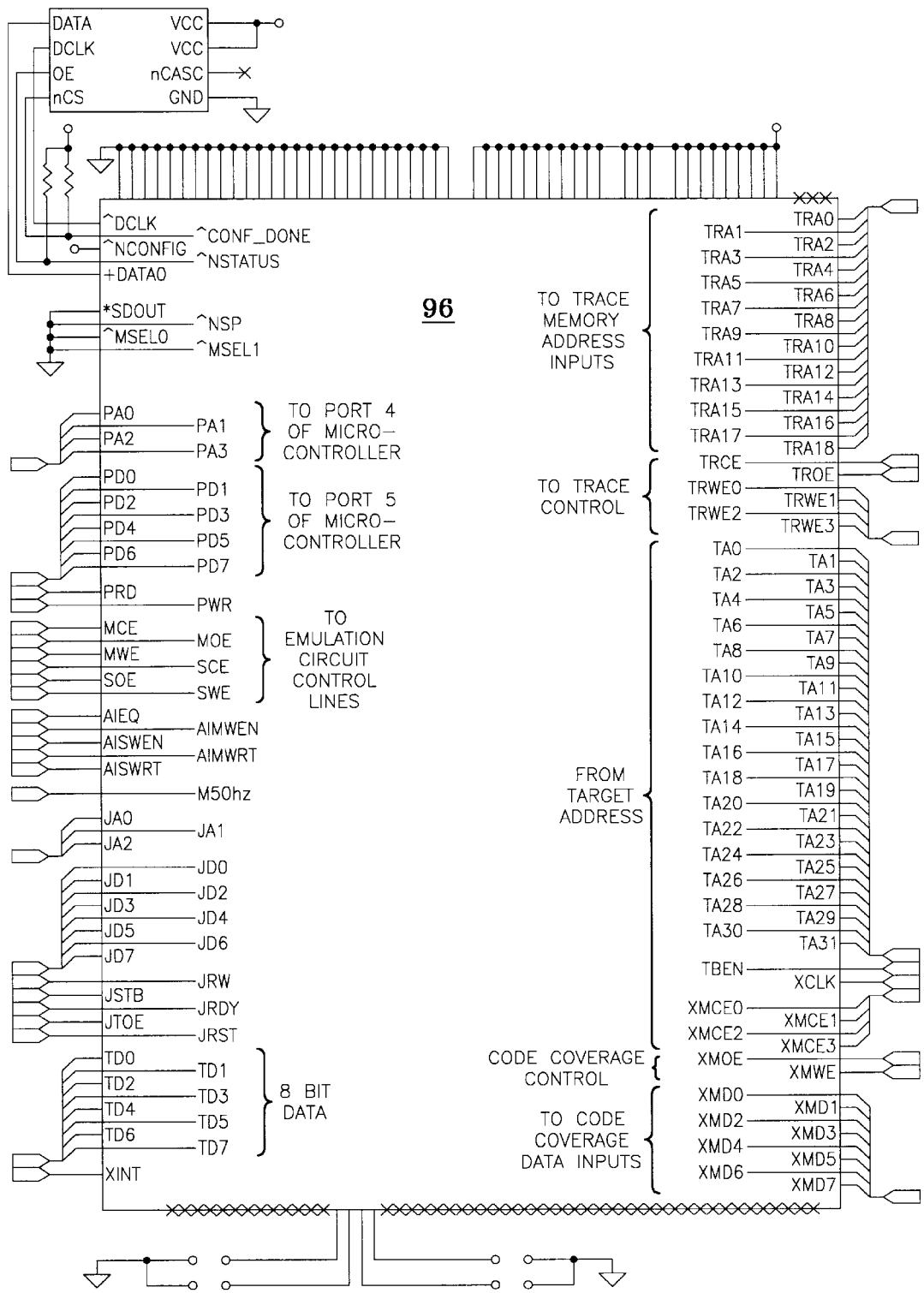
FIGS. 6A–6D illustrate an example circuit schematic of the connections between the trace memory, code coverage memory, and an example programmable logic unit implemented with code coverage control circuits, trace control circuits, and fine trace control circuits.
Figure 7:
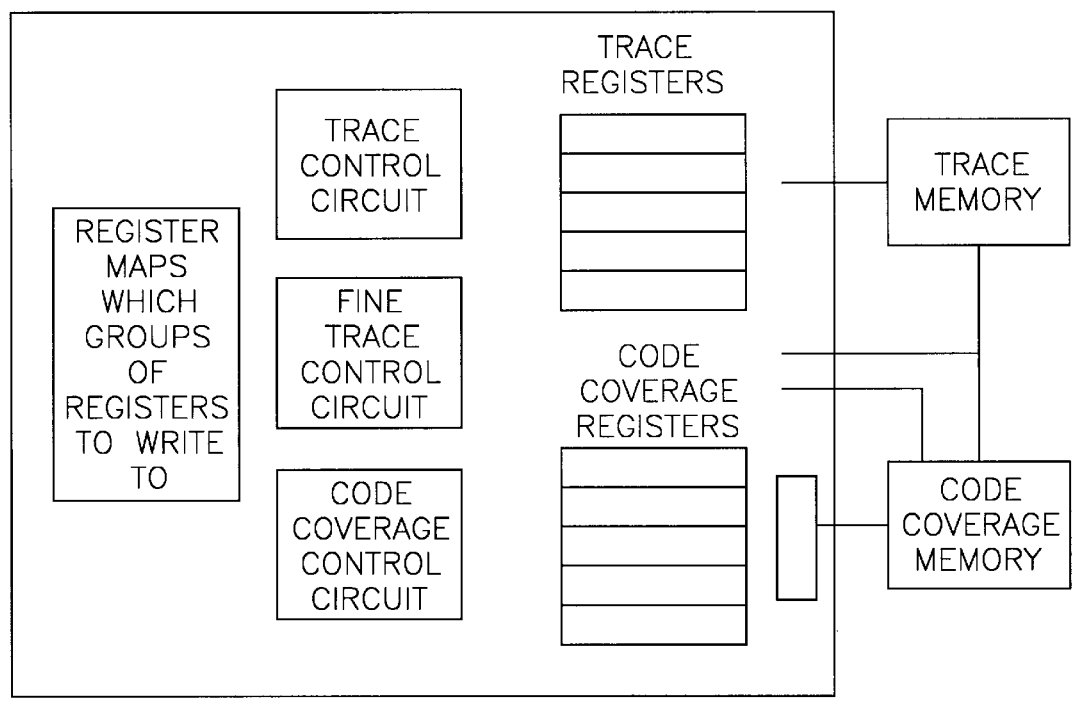
FIG. 7 illustrates a block diagram of one example of the programmable logic unit of FIG. 6A.

FIG. 6A illustrates an example programmable logic device 96 for implementing the trace control circuit, fine trace control circuit, and code coverage control circuit of the present invention. In this example, the PLD 96 is an Altera® PLD. For example, the Altera EPF6016QC208 or EPF81500AQC240 chips may be used. It is appreciated that other comparable PLDs may be used. For example, the XILINX XC4020E or XC5210 chips may be used for the interface circuit. As discussed, the PLD 96 may be programmed and customized to allow one or more logic functions. (In other embodiments, the trace control circuit, the fine trace control circuit, and the code coverage control circuit may be implemented via separate chips or via a field programmable gate array (FPGA)). PLDs are generally array oriented devices that typically have an AND-OR structure with registers. These PLDs may be programmed by first capturing the designs by writing design code in a hardware descriptive language (HDL), compiling, then burning the program onto the PLD. HDL is language that allows the description of the behavior of electronic components ranging from simple logic gates to complete microprocessors. HDL allows for the description of many electrical aspects of circuit behavior (e.g., delays, rise and fall times.). Example portions of HDL code used to program the PLD 96 of FIG. 6A for performing some of the functions of the present invention are provided at the end of the specification. As discussed above, the PLD 96 is programmed to perform the functions of the code coverage control circuit, trace control circuit, and the fine trace control circuit as described above. FIG. 7 illustrates a block diagram of one example of the programmable logic device of FIG. 6A illustrating the very basic components of a typical interface circuit of the present invention.

Figure 6B:
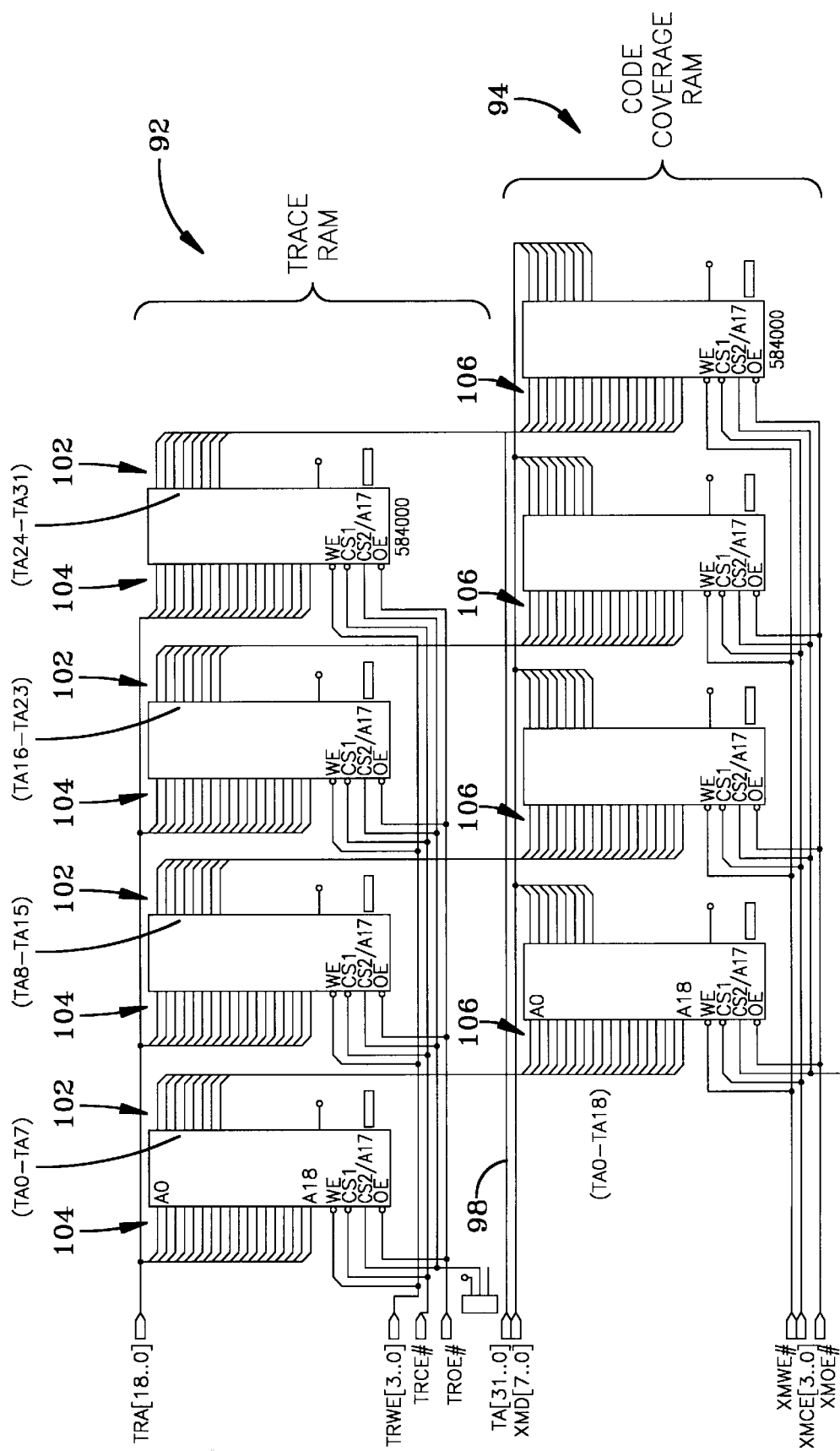

FIG. 6B illustrates the trace memory (RAM) circuits 92 and the code coverage memory (RAM) circuits 94. In this example embodiment, the trace memory 92 is configured to store 32 bits of trace data (8 bits into each chip). Additionally, in this example embodiment, the trace data consists of 21 target address signals and 11 signals received directly from the target system. For example, the data inputs 102 of the trace memory 92 accept the signals TA0–TA31 (TA0–TA20 being target address signals). These target address signals are stored into the location of the trace memory 92 addressed by the trace address signals TRA0–TRA18 received from the PLD 96 (trace control circuit). These trace address signals are received at the address inputs 104 of the trace memory 92.

The code coverage memory 94 is addressed according to the signals from bus lines 98. As discussed, in the example of FIG. 6B, the code coverage memory 94 may be mapped. As target system accesses the emulated ROM, the corresponding location in the code coverage memory 94 is also being addressed (again TA0–TA18 used when 512K chips are used and TA0–TA16 when 128K chips are used). As the code coverage memory 94 is addressed, code coverage data is inputted into the addressed locations by the PLD 96 (code coverage control circuit via lines XMD0–XMD7). As discussed, the code coverage data is loaded via predetermined registers programmed within the PLD 96. The write enable signal (XMWE) is used to write data into locations of the code coverage memory 94. Again, as discussed, the code coverage memory 94 may also be used as fine trace control (data is read as opposed to written for each addressed location). The code coverage memory 94 preferably consists of map memory that may, for example, be 128K or 512K or 1024K or 2048K bytes deep.

Figure 6C:
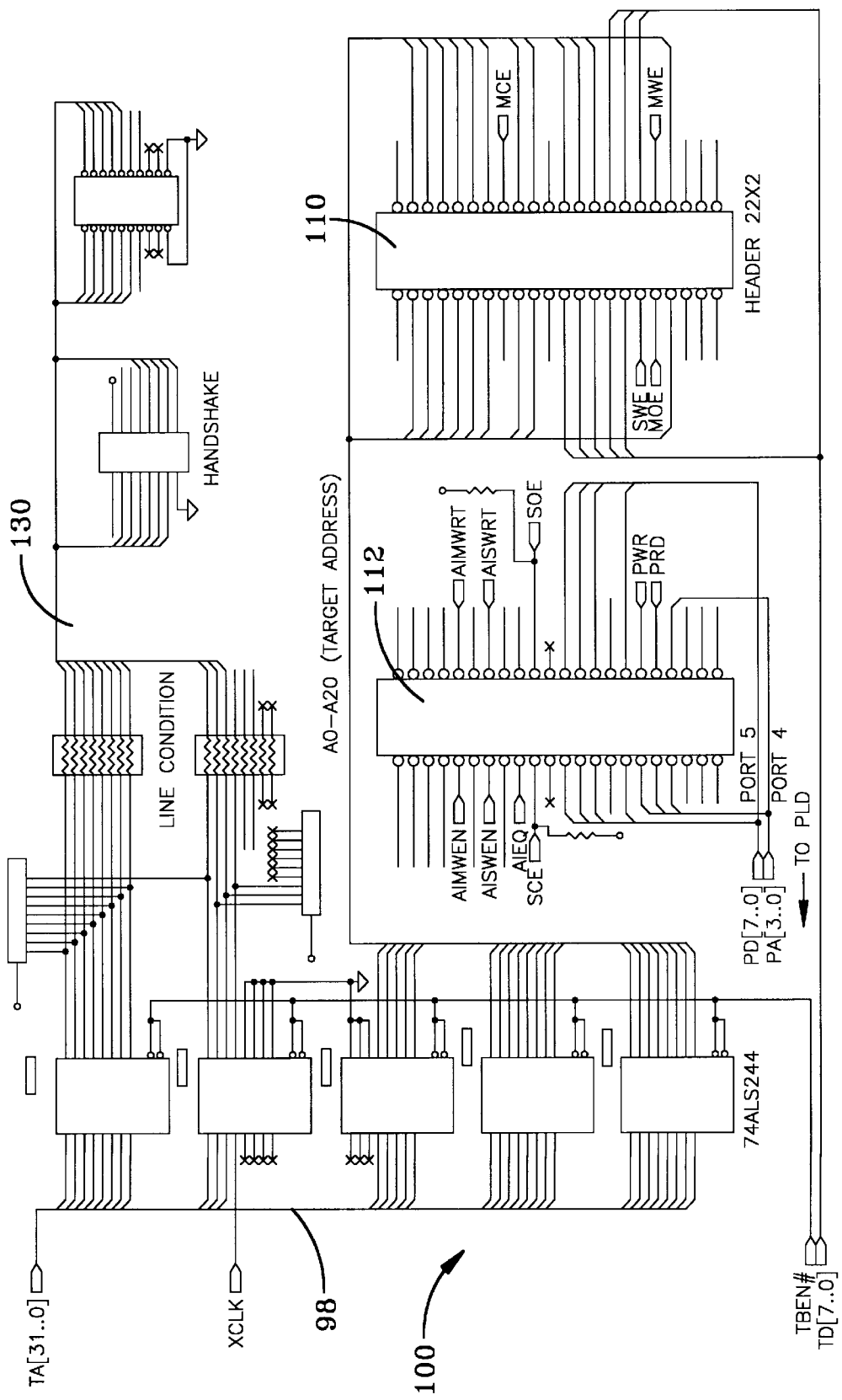

FIG. 6C illustrates the buffer interface 100 of the example circuit schematic of FIGS. 6A–6D. As previously discussed, the buffer 100 may be used to isolate the trace memory 92 and code coverage memory 94 from the target address signals (A0–A20) present on the target address lines 114. The target address signals from the target address lines 114 are inputted into the buffer 100 and are outputted to the trace memory 92 and code coverage memory 94 on bus 98. The connector 110 is shown connected to the target address lines 114. The connector 110 connects the address signals coming from the ROM socket to the buffers 100 for connection to the trace memory 92 and code coverage memory 94 and PLD 96. Connector 112 is also used as an interface between the emulation circuit and the code coverage system of the present invention.

Figure 6D:
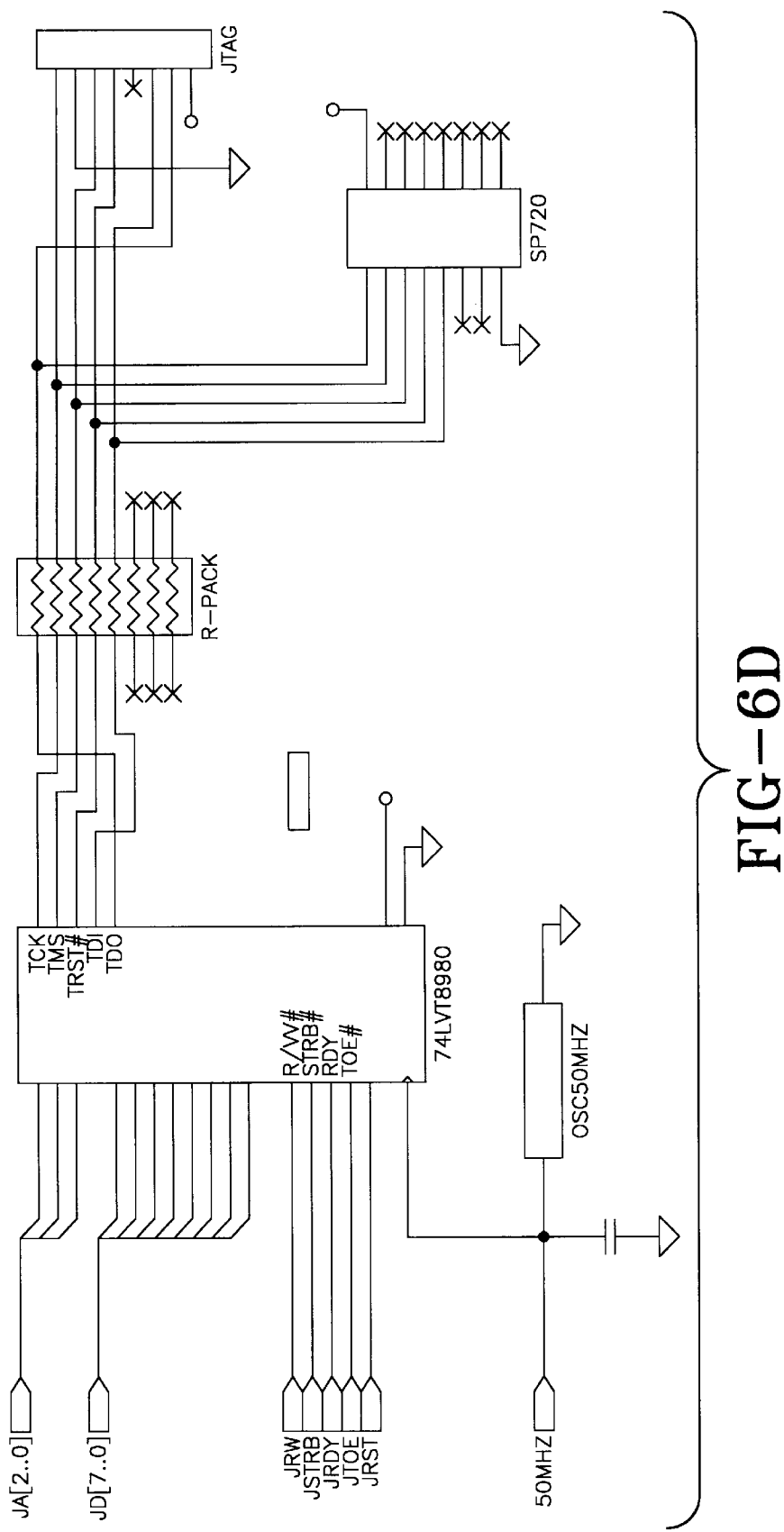

FIG. 6D depicts an example JTAG controller with appropriate line connections with the other schematics of FIGS. 6A–6C.

FIG. 8A illustrates one example embodiment of an emulation circuit used in conjunction with the code coverage/trace system of the present invention (e.g. as illustrated in FIGS. 6A–6D). FIGS. 8B and 8C are merely blown-up portions of the circuit of FIG. 8A. The emulation circuit of FIG. 8A is connected to the target system ROM via the ROM socket 120. The ROM socket 120 passes the target address signals A0–A20, target data signals D0–D7, and the output enable and chip select signals to the emulation circuit of FIG. 8A. In the preferred embodiment, buffers 122, isolate the target system from the emulation circuit. The lines from the ROM socket 120 are connected to the emulated memory 124. The Phillips microcontroller 126 and associated interfaces are shown. See the discussion of FIG. 5 for a detailed discussion of the port assignments. Again, the emulation circuit of FIG. 8A is connected to the code coverage/trace system of the present invention (shown in FIGS. 6A–6C) via connectors 110 and 112.

In operation, as the target system access the emulated memory 124 via the ROM socket 120, the target address signals are sent to the code coverage/trace system of the present invention via connector 110. External signals are passed to the code coverage/trace system of the present invention via the circuit shown at 130 in FIG. 6C. Accordingly, trace data and code coverage data are collected on the accesses to the emulated memory 124 as previously discussed.

For example, as discussed, in the example circuit of FIG. 6B, there are four separate memory chips used to store code coverage data. (In the example circuit of FIGS. 8A–8C, signals A0–A20 represent the target address lines, these signals along with the target data lines and control lines are connected to the emulation circuit through the ROM socket. Lines TA0–TA31 in the example circuit represent the lines connected to the trace memory data lines where TA0–TA20 come directly from the ROM socket and where lines TA21–TA30 come from external signals from the target system at 130.) Accordingly, one of the four code coverage memory chips 94 shown in FIG. 6B is used to store the code coverage data provided by the PLD (FIG. 6A). In one embodiment, signals on lines TA17–TA23 are used to determine which of the four chips to store the code coverage data. In other words, when the address signals from the emulated memory are received at the PLD, the signals on lines TA17–TA23 are sent into a decision circuit (e.g. comparator) programmed into the PLD. Based on the signals received on lines TA17–TA23, the interface circuit 14 outputs a signal enabling the appropriate memory chip 94 for storage of the code coverage data. Signals from TA21–TA23 may come from external signals (not from the ROM socket 120) which allows mapping of the code coverage memory based on these external signals.

In the example circuit, the interface to a host system is preferably through the Phillips microcontroller 126 (FIG. 5). In the example circuit, the controller 126 is the primary means of controlling the interfaces. The controller of the example circuit uses a 4 bit address and an 8 bit data bus with read and write strobe lines to communicate with the host interface. The host interface in the example circuit consists of a single register. The host, via the controller, selects the proper device and writes its code in that register. That device and its set of registers may be selected for further operation. Thus the host may select, program and monitor the status of any of the interfaces provided. In the example circuit, this interface occupies 4 consecutive bytes of the master ROM module. The host can turn on the interface via a predetermined control register allowing the host to control the interrupt, write enables to the emulated ROM space and choose to patch the ROM space. An additional option is to allow the interface to operate in a direct write mode for target data to host. The sampling edge of the target clock may be deskewed by the amount specified in the AI status register.

While the JTAG interfaces are selected, the controller address bus and data busses are connected through the JTAG controller. A register set internal to the JTAG controller chip may be offset by 8, thus register 0–7 becomes register 8-F. This may be done to allow accessing the interface register to switch between devices.

The code trace in the example circuit is controlled by a set of control registers programmed into the PLD. These registers are used for trace, for example, once the address location is received to start the control register value in the PLD is compared with the address on the bus and if it matches the start trace bit is actuated. This decision to take a trace (or not to) is accomplished within one ROM clock cycle as previously discussed. The trace interface is adapted to operate once a START bit is set within a trace control register. A code trace start and stop register may be used to generate break. Skip and trace counters also may be implemented to allow more sophisticated control. Clock management is accomplished by specifying trace delay bits within trace registers that will deskew the clock by multiples (0–3) of 20 nanoseconds.

The control of the code coverage interface is similarly interfaced using control registers. For example, a predetermined bit of a control register may be set for the code coverage to act as a code coverage memory (as opposed to fine trace). Additionally, when access is made to any mapped location of the code coverage memory, the contents of a control register may be written to it. The contents of this control register may be changed to allow storage of different bit patterns.

Example portions of Source Code for the PLD

```
5      -- Implements a 32 bit CodeTrace with control. The trace is 128k or 512k deep
       -- Implements the CodeCoverage (map) memory that is 512K, 1M or 2M deep
       -- The map memory can also be used for fine grain trace control
       -- JTAG is the TI SN74LVT8980 controller chip (3VDC)
       -- + - + - + - + - + - + - + - + - + - + - + - + - + - + - + - + - +
10     -- function prototypes FUNCTION 74164(clk, clrn, a, b)
            RETURNS (qa, qb, qc, qd, qe, qf, qg, qh);

15     FUNCTION lpm_compare (dataa[LPM_WIDTH-1..0], datab[LPM_WIDTH-1..0], clock, aclr)
           WITH (LPM_WIDTH, LPM_REPRESENTATION, LPM_PIPELINE, CHAIN_SIZE,
       ONE_INPUT_IS_CONSTANT)
           RETURNS (alb, aeb, agb, ageb, aneb, aleb);
       -- + - + - + - + - + - + - + - + - + - + - + - + - + - + - + - + - +
20     -- Initialization of Host interface registers constant CNTLSTS        = 0;      % control status register %
       constant CONFIGD        = 1;      % configuration register %
       constant SELF           = 0;      % talking to self %
25     constant AI             = 1;      % select AI %
       constant JTAG           = 2;      % select JTAG %
       constant TRACE          = 3;      % select TRACE %
       constant XMAP           = 4;      % select XMAP %
       -- + - + - + - + - + - + - + - + - + - + - + - + - + - + - + - + - +
30     -- JTAG registers constant JTCONTROL      = 2;      % control register %
       -- + - + - + - + - + - + - + - + - + - + - + - + - + - + - + - + - +
       -- Trace registers
35
       constant TRCNTLA        = 2;      % interface register %
       constant TRCNTLB        = 4;      % trace control register %
       constant TRCNTLC        = 5;      % auxilliary control register %

40     constant TRACEAX        = 6;      % trace address extended %
       constant TRACEAH        = 8;      % trace address high byte%
       constant TRACEAL        = 9;      % trace address low byte %
       constant TRACED3        = 15;     % trace data (x7-x0) %
       constant TRACED2        = 7;      % trace data (a23-a16) %
45     constant TRACED1        = 3;      % trace data (a15-a8) %
       constant TRACED0        = 1;      % Trace data (a7..a0) %
```

-- alternate set of registers / shadow the ones above when regbank is set

```
        constant STARTX           = 3;       % trace start address extended %
        constant STARTH           = 4;       % trace start address high byte %
        constant STARTM           = 5;       % trace start address mid byte %
        constant STARTL           = 6;       % trace start address low byte % constant STOPX    = 7;    % trace stop address extended %
        constant STOPH    = 8;    % trace stop address high byte %
        constant STOPM    = 9;    % trace stop address mid byte %
        constant STOPL    = 10;   % trace stop address low byte % constant CNTAH    = 11;   % auxilliary counter-a high byte %
        constant CNTAL    = 12;   % auxilliary counter-a low byte %
        constant CNTBH    = 13;   % auxilliary counter-b high byte %
        constant CNTBL    = 14;   % auxilliary counter-b low byte % constant NONE     = 0;    % select counter - none %
        constant ONE      = 1;    % select counter - a %
        constant TWO      = 2;    % select counter - b %
        constant BOTH     = 3;    % select counter - a and b %
-- + - + - + - + - + - + - + - + - + - + - + - + - + - + - + - + - + - + - + - +
-- XMAP register constant XMCNTLA          = 1;       % control register %
        constant XMCNTLB          = 2;       % control register %
        constant XMCNTLC          = 3;       % control register % constant MAPAX            = 4;       % map address extended %
        constant MAPAH            = 5;       % map address high %
        constant MAPAL            = 6;       % map address low %
        constant XCNTAH           = 7;       % auxilliary counter-a high byte %
        constant XCNTAL           = 8;       % auxilliary counter-a low byte %
        constant XCNTBH           = 9;       % auxilliary counter-b high byte %
        constant XCNTBL           = 10;      % auxilliary counter-b low byte %
        constant MDATA            = 11;      % map data %
        constant MAP0             = 12;      % map 0 compare value %
        constant MAP1             = 13;      % map 1 compare value %
        constant MAP2             = 14;      % map 2 compare value %
        constant MAP3             = 15;      % map 3 compare value %
-- + - + - + - + - + - + - + - + - + - + - + - + - + - + - + - + - + - + - + - +
-- pin interface to the outside world subdesign trace
        (
        pa[3..0]                  :input;    % PromICE address bus %
        pd[7..0]                  :bidir;    % PromICE data bus %
        prd                       :input;    % PromICE read signal %
        pwr                       :input;    % PromICE write signal % mce                       :input;    % master ROM chip select %
        moe                       :input;    % master ROM output enable %
        mwe                       :input;    % master ROM write enable %
        sce                       :input;    % slave ROM chip select %
        soe                       :input;    % slave ROM output enable %
        swe                       :input;    % slave ROM write enable % ja[2..0]                  :output;   % address bus %
```

28

```
            jd[7..0]              :bidir;   % bidirectional data bus %
            jrw                   :output;  % read/write mode pin %
            jstb                  :output;  % data transfer strobe %
            jrdy                  :input;   % wait I'm not ready %
 5          jtoe                  :output;  % enable TAP outputs %
            jrst                  :output;  % reset the device % ta[31..0]             :bidir;   % target address bus also trace data bus %
            td[7..0]              :bidir;   % target data bus %
10          xclk                  :input;   % direct access %
            tben                  :output;  % enable target address bus buffers % tra[20..0]            :output;  % trace memory address %
            trce                  :output;  % trace memory chip_enable %
15          troe                  :output;  % trace memory output_enable %
            trwe[3..0]            :output;  % trace memory write_enable % xmce[3..0]            :output;  % xmem chip_enable %
            xmoe                  :output;  % xmem output_enable %
20          xmwe                  :output;  % xmem write_enable %
            xmd[7..0]             :bidir;   % xmem data bus % xintx                 :output;  % interrupt the target %
            m50hz                 :input;   % 50 mhz clock input %
25          config[3..0]          :input;   % external configuration information %
            )
-- + - + - + - + - + - + - + - + - + - + - + - + - + - + - + - + - + - + - + - +
-- Internal variables, flip-flops and nodes 30   variable
            -- tri-state the data on the pd[] bus pdb[7..0]             :node;    % put stuff on pd[] %
-- + - + - + - + - + - + - + - + - + - + - + - + - + - + - + - + - + - + - + - +
35          -- host interface variables dev[2..0]             :dffe;    % device code we are talking to %
            kbrkint               :dffe;    % kill break interrupt %

40          selectrace            :node;    % select trace %
            selectxmap            :node;    % select trace % tclk                  :node;    % target access %
            mrd                   :node;    % master rom read %
45          mwr                   :node;    % master rom write %
            srd                   :node;    % slave rom read %
            swr                   :node;    % slave rom write %
            xint                  :node;    % interrupt condition %

50          pwctl                 :node;    % write control register %
            pwcfg                 :node;    % write config register %
-- + - + - + - + - + - + - + - + - + - + - + - + - + - + - + - + - + - + - + - +
            setkbrkint            :node;    % set xbrkint via target write %
```

29

```
-- +-+-+-+-+-+-+-+-+-+-+-+-+-+-+-+-+-+-+-+-+-+-+-+
    -- JTAG registers jtagrw          :dffe;      % jtag read/write %
    jtagtoe         :dffe;      % TAP output enable %
    jtagrst         :dffe;      % reset device %
    jdb[7..0]       :node;      % data on jd[] %
    jdenb           :node;      % enable for above %
    pwjtag          :node;      % write control register %
-- +-+-+-+-+-+-+-+-+-+-+-+-+-+-+-+-+-+-+-+-+-+-+-+
    -- CodeTrace variables start           :dffe;      % 0 - enable trace circuitry %
    mine            :dffe;      % 1 - the trace is being operated by host %
    twrite          :dffe;      % 2 - trace write by micro %
    regbank         :dffe;      % 3 - select alternate registers %
    tsize           :dffe;      % 4 - 128K or 512K deep trace memory %
    csize           :dffe;      % 5 - compare 24 or 32 bit %
    genwrite        :dffe;      % 6 - generate the write pulse %
    tsize2          :dffe;      % 4 - 512K or 2M deep trace memory % tracea          :dffe;      % 0 - trace all %
    tracer          :dffe;      % 1 - set range %
    traces          :dffe;      % 2 - trace from start address %
    tracep          :dffe;      % 3 - trace till stop address %
    tracesp         :dffe;      % 4 - trace from start to stop %
    traceov         :dffe;      % 5 - trace till memory overflows %
    traceca         :dffe;      % 6 - use counter a %
    tracecb         :dffe;      % 7 - use counter b % usetclk         :dffe;      % 0 - use tclk for tracing %
    usexclk         :dffe;      % 1 - use xclk for tracing %
    breakats        :dffe;      % 2 - break when at start %
    breakatp        :dffe;      % 3 - break when at stop %
    breakca         :dffe;      % 4 - use counter a with breakats %
    breakcb         :dffe;      % 5 - use counter b with breakatp %
    trdelay0        :dffe;      % 6 - deskew the clock %
    trdelay1        :dffe;      % 7 - deskew the clock %

-- more trace registers tract[21..0]    :dffe;      % trace address counter %
    starta[31..0]   :dffe;      % trace start address %
    stopa[31..0]    :dffe;      % trace stop address %
    acnta[16..0]    :dffe;      % auxilliary counter a %
    acntb[16..0]    :dffe;      % auxilliary counter b %
    tdout[31..0]    :node;      % sending stuff to trace data bus %
    tdoenb          :node;      % enable stuff to the above bus %

-- internally generated signals for controlling the interface tracenb         :node;      % increment the trace counter %
    tracequ         :node;      % intermediate trace qualifier % startrace       :dffe;      % start tracing for ever %
    stoptrace       :dffe;      % stop tracing for ever %
    breakseen       :dffe;      % break is seen %
    traceseen       :dffe;      % some trace has happened %
```

30

| | | |
|---|---|---|
| setstart | :node; | % trace on per control % |
| setstop | :node; | % trace off per control % |
| setbreak | :node; | % turn on the break condition % |
| setrace | :node; | % turn on trace happened % |
| startevnt | :node; | % startevent marker % |
| stopevent | :node; | % stopevent marker % |
| breakevnt | :node; | % break event occured % |
| tracevent | :node; | % trace counter event % |
| geindic | :node; | % general event indicator % |
| | | |
| traceovr | :node; | % trace counter voerflow % |
| tracecao | :node; | % counter a overflow % |
| tracecbo | :node; | % counter b overflow % |
| acntaenb | :node; | % enable counter a operation % |
| acntbenb | :node; | % enable counter b operation % |
| | | |
| iseqs | :node; | % address is equal to start % |
| iseqp | :node; | % address is equal to stop % |
| isges | :node; | % address is greater than equal to start % |
| islep | :node; | % address is less than equal to stop % |
| | | |
| trclk | :node; | % composite trace clock % |
| trdel0 | :node; | % 20 nano-seconds % |
| trdel1 | :node; | % 40 nano-seconds % |
| trdel2 | :node; | % 60 nano-seconds % |
| trdel3 | :node; | % 80 nano-seconds % |
| trdel4 | :node; | % 100 nano-seconds % |
| trdel5 | :node; | % 120 nano-seconds % |
| trdelay | :node; | % selected delay % |
| delclk | :node; | % combined clock % |

-- signals to enable various register for micro to write to them

| | | |
|---|---|---|
| pwctla | :node; | % write control bits in status register % |
| pwctlb | :node; | % write control register % |
| pwctlc | :node; | % write alt control register % |
| | | |
| pwtractx | :node; | % write trace address counter extended byte % |
| pwtracth | :node; | % write trace address counter high byte % |
| pwtractl | :node; | % write trace address counter low byte % |
| | | |
| pwstartx | :node; | % write trace start address extended byte % |
| pwstarth | :node; | % write trace start address high byte % |
| pwstartm | :node; | % write trace start address mid byte % |
| pwstartl | :node; | % write trace start address low byte % |
| | | |
| pwstopx | :node; | % write trace stop address extended byte % |
| pwstoph | :node; | % write trace stop address high byte % |
| pwstopm | :node; | % write trace stop address mid byte % |
| pwstopl | :node; | % write trace stop address low byte % |
| | | |
| pwacntah | :node; | % write auxilliary counter-a high byte % |
| pwacntal | :node; | % write auxilliary counter-a low byte % |
| | | |
| pwacntbh | :node; | % write auxilliary counter-b high byte % |
| pwacntbl | :node; | % write auxilliary counter-b low byte % |

31

```
-- +-+-+-+-+-+-+-+-+-+-+-+-+-+-+-+-+-+-+-+-+-+-+
    -- XMAP variables and registers xmdb[7..0]         :node;   % put stuff on xmd[] %

-- control register a bits xstart             :dffe;   % 0 - start trace %
    xmine              :dffe;   % 1 - the trace is being operated by host %
    xwrite             :dffe;   % 2 - trace write by micro %
    xsize              :dffe;   % 3 - using 128 or 512k chips %
    xgenwrite          :dffe;   % 4 - generate the write pulse %
    xtrdelay0          :dffe;   % 5 - deskew the clock %
    xtrdelay1          :dffe;   % 6 - deskew the clock %

-- control register b bits xtracea            :dffe;   % 0 - enable trace always %
    xtraceas           :dffe;   % 0 - trace alwyas seen %
    xtraces            :dffe;   % 1 - enable trace start %
    xtracess           :dffe;   % 1 - start trace seen %
    xtracep            :dffe;   % 2 - enable trace stop %
    xtraceps           :dffe;   % 2 - stop trace seen %
    xtraceca           :dffe;   % 3 - enable counter a %
    xtracecb           :dffe;   % 4 - enable counter b %
    xbreakhe           :dffe;   % 5 - enable break here %
    xbreakher          :dffe;   % 5 - break here happened %
    xbreakca           :dffe;   % 6 - enable break counter a %
    xbreakcb           :dffe;   % 7 - enable break counter b %

-- control register c bits xusetclk           :dffe;   % 0 - use tclk %
    xusexclk           :dffe;   % 1 - use xclk %
    cover              :dffe;   % 2 - do code coverage %
    mape0              :dffe;   % 3 - enable map-0 %
    mape1              :dffe;   % 4 - enable map-1 %
    mape2              :dffe;   % 5 - enable map-2 %
    mape3              :dffe;   % 6 - enable map-3 %

-- more trace registers xmact[20..0]       :dffe;   % xmap address counter %
    breaka[31..0]      :dff;    % break address as seen %
    xacnta[16..0]      :dffe;   % auxilliary counter a %
    xacntb[16..0]      :dffe;   % auxilliary counter b %
    xmape0[7..0]       :dffe;   % compare value for enable %
    xmape1[7..0]       :dffe;   % compare value for enable %
    xmape2[7..0]       :dffe;   % compare value for enable %
    xmape3[7..0]       :dffe;   % compare value for enable %
    xmapx[7..0]        :node;   % mask bits not to compare %
    xmapeq0            :node;   % select the map %
    xmapeq1            :node;   % select the map %
    xmapeq2            :node;   % select the map %
    xmapeq3            :node;   % select the map %
    xms0               :node;   % micro select %
    xms1               :node;   % micro select %
```

-- internally generated signals for controlling the interface

| | | |
|---|---|---|
| xmdenb | :node; | % enable PromICE data to map memory % |
| xacntaenb | :node; | % enable counter a % |
| xacntbenb | :node; | % enable cunter b % |
| xtracecao | :node; | % counter a overflow % |
| xtracecbo | :node; | % counter b overflow % |
| xstarttrace | :dffe; | % start trace per map mem % |
| xstoptrace | :dffe; | % stop trace per map mem % |
| xsetstart | :node; | % trace on per x map % |
| xsetstop | :node; | % trace off per x map % |
| xtracequ | :node; | % let trace thru % |
| xtracevnt | :node; | % trace event % |
| xstartevnt | :node; | % start event % |
| xstopevent | :node; | % stop event % |
| xbreakevnt | :node; | % break event % |
| xselect1 | :node; | % selector % |
| xselect2 | :node; | % selector % |
| xsetbs | :node; | % set break seen % |
| xsetps | :node; | % set stop seen % |
| xsetss | :node; | % set start seen % |
| xsetas | :node; | % set all seen % |
| xsetbsevnt | :node; | % set break seen event % |
| xsetpsevnt | :node; | % set stop seen event % |
| xsetssevnt | :node; | % set start seen event % |
| xsetasevnt | :node; | % set always seen event % |
| xgeindic | :node; | % general event indicator % |

-- signals to enable various register for micro to write to them

| | | |
|---|---|---|
| pwxctla | :node; | % write control register a % |
| pwxctlb | :node; | % write control register b % |
| pwxctlc | :node; | % write control register c % |
| pwxmactx | :node; | % write map memory address counter extended byte % |
| pwxmacth | :node; | % write map memory address counter high byte % |
| pwxmactl | :node; | % write map memory address counter low byte % |
| pwxcntah | :node; | % write skip counter high byte % |
| pwxcntal | :node; | % write skip counter high byte % |
| pwxcntbh | :node; | % write skip counter high byte % |
| pwxcntbl | :node; | % write skip counter high byte % |
| pwxmdata | :node; | % read or write map memory % |
| pwxmape0 | :node; | % write map memory comparator % |
| pwxmape1 | :node; | % write map memory comparator % |
| pwxmape2 | :node; | % write map memory comparator % |
| pwxmape3 | :node; | % write map memory comparator % |

-- clock management

| | | |
|---|---|---|
| xtrclk | :node; | % trace clock % |
| xtrdel0 | :node; | % 20 nano-seconds % |
| xtrdel1 | :node; | % 40 nano-seconds % |
| xtrdel2 | :node; | % 60 nano-seconds % |
| xtrdel3 | :node; | % 80 nano-seconds % |
| xtrdel4 | :node; | % 100 nano-seconds % |
| xtrdel5 | :node; | % 120 nano-seconds % |
| xtrdelay | :node; | % selected delay % |
| xdelclk | :node; | % combined clock % |

33

```
-- +-+-+-+-+-+-+-+-+-+-+-+-+-+-+-+-+-+-+-+-+-+-+-+
-- start of logic section. First declare all signals that default to VCC begin
5           defaults
                xmce[]          = (vcc, vcc, vcc, vcc);
                xmoe            = vcc;
                xmwe            = vcc;
                trwe[]          = (vcc, vcc, vcc, vcc);
10              trce            = vcc;
                troe            = vcc;
                setstart        = vcc;
                setstop         = vcc;
                setbreak        = vcc;
15              setrace         = vcc;
                startevnt       = vcc;
                stopevent       = vcc;
                xsetas          = vcc;
                xsetss          = vcc;
20              xsetps          = vcc;
                xsetbs          = vcc;
                xsetasevnt      = vcc;
                xsetssevnt      = vcc;
                xsetpsevnt      = vcc;
25              xsetbsevnt      = vcc;
                xsetstart       = vcc;
                xsetstop        = vcc;
                xstartevnt      = vcc;
                xstopevent      = vcc;
30              setkbrkint      = vcc;
                jstb            = vcc;
                jtoe            = vcc;
                jrst            = vcc;
                jrw             = vcc;
35          end defaults;
-- +-+-+-+-+-+-+-+-+-+-+-+-+-+-+-+-+-+-+-+-+-+-+-+
-- HOST interface to the PromICE micro-controller (87C451)
-- setup the PromICE write cycle connections 40          -- write the control register for host dev[].clk = pwr;
            dev[].ena = pwctl;
            dev[].d = pd[2..0];
45
            kbrkint.clk = pwr;
            kbrkint.ena = pwcfg;
            kbrkint.d = gnd;
            kbrkint.prn = setkbrkint;
50
            -- read interface / for all reads for i in 0 to 7 generate
                pd[i]       = tri(pdb[i], !prd);
55          end generate;
```

```
                -- select proper device for communication (shows how the host selects different internal
                -- devices, trace, JTAG, XMAP code coverage)

case dev[] is
 5                  when JTAG =>
                        selectjtag = vcc;
                    when TRACE =>
                        selectrace = vcc;
                    when XMAP =>
10                      selectxmap = vcc;
                    when SELF =>
                        if pa[] == CONFIGD then
                            pdb[] = (config[], gnd, gnd, gnd, vcc);
                            pwcfg = vcc;
15                      end if;
                end case;

-- if talking to self 20              if pa[] == CNTLSTS then
                    pwctl = vcc;
                    pdb[] = (xint, traceseen, stoptrace, xstoptrace, breakseen, xbreakher, aihda, aitda);
                end if;

25              -- generate the interrupt signal xint = (breakseen & !kbrkint) # (xbreakher & !kbrkint) # aint;
                !xintx = xint;

30              -- generate the clock signals

!mrd = !mce&!moe;
                !mwr = !mce&!mwe;
                !srd = !sce&!soe;
35              !swr = !sce&!swe;
                !tclk = !mrd # !mwr # !srd # !swr;

-- +-+-+-+-+-+-+-+-+-+-+-+-+-+-+-+-+-+-+-+-+-+
                -- JTAG interface to TiSN74LVT8980
40
                (jtagrst, jtagtoe, jtagrw).clk      = pwr;
                (jtagrst, jtagtoe, jtagrw).ena      = pwjtag;
                (jtagrst, jtagtoe, jtagrw).d        = pd[2..0];

45              jrw     = !jtagrw;
                jtoe    = !jtagtoe;
                jrst    = !jtagrst;

if selectjtag then
50                  if pa[] == JTCONTROL then
                        pwjtag = vcc;
                        pdb[0] = jrdy;
                    end if;

55                  -- connect address and data bus to the chip
                    -- and do the read or write operation if pa[3] then
```

```
                          ja[2..0] = pa[2..0];
                          if jtagrw then
                                  !jstb = !prd;
                                  pdb[] = jd[];
 5                        else
                                  !jstb = !pwr;
                                  jdb[] = pd[];
                                  jdenb = vcc;
                          end if;
10              end if;
        end if;

-- connect data bus to the chip 15      for i in 0 to 7 generate
                jd[i] = tri(jdb[i], jdenb);
        end generate;

-- End of JTAG Interface Design
20 -- +-+-+-+-+-+-+-+-+-+-+-+-+-+-+-+-+-+-+-+-+-+-+-+-+-+
   -- CodeTrace interface starts here -- write the control register - a 25      (tsize2, genwrite, csize, tsize, regbank, twrite, mine, start).clk      = pwr;
        (tsize2, genwrite, csize, tsize, regbank, twrite, mine, start).ena      = pwctla;
        (tsize2, genwrite, csize, tsize, regbank, twrite, mine, start).d        = pd[];

-- write the control register - b
30
        (tracecb, traceca, traceov, tracesp, tracep, traces, tracer, tracea).clk = pwr;
        (tracecb, traceca, traceov, tracesp, tracep, traces, tracer, tracea).ena = pwctlb;
        (tracecb, traceca, traceov, tracesp, tracep, traces, tracer, tracea).d   = pd[];

35      (stoptrace, startrace, breakseen, traceseen).clk     = pwr;
        (stoptrace, startrace, breakseen, traceseen).ena     = pwctlb;
        (stoptrace, startrace, breakseen, traceseen).d = (gnd, gnd, gnd, gnd);
        startrace.prn    = setstart;
        stoptrace.prn    = setstop;
40      breakseen.prn    = setbreak;
        traceseen.prn    = setrace;

-- write control register - c 45      (trdelay1, trdelay0, breakcb, breakca, breakatp, breakats, usexclk, usetclk).clk  = pwr;
        (trdelay1, trdelay0, breakcb, breakca, breakatp, breakats, usexclk, usetclk).ena  = pwctlc;
        (trdelay1, trdelay0, breakcb, breakca, breakatp, breakats, usexclk, usetclk).d    = pd[];

-- clock management, create deskew from the leading edge and generate write strobe
50
        delclk = (usetclk & !tclk) # (usexclk & !xclk);
        (trdel0, trdel1, trdel2, trdel3, trdel4, trdel5,,) = 74164(m50hz, delclk, vcc, vcc);

case (trdelay1, trdelay0) is
55              when 0 =>
                        trdelay = !trdel2 # genwrite;
                when 1 =>
                        trdelay = (trdel0 & !trdel3) # genwrite;
```

```
                when 2 =>
                        trdelay = (trdel1 & !trdel4) # genwrite;
                when 3 =>
                        trdelay = (trdel2 & !trdel5) # genwrite;
        end case;

-- write the trace address counter if !start then
                tract[].clk             = pwr;
                tract[21..16].ena       = pwtractx;
                tract[21..16].d         = pd[5..0];
                tract[15..8].ena        = pwtracth;
                tract[15..8].d          = pd[];
                tract[7..0].ena         = pwtractl;
                tract[7..0].d           = pd[];
        end if;

-- define what are the overflow bits
        if tsize2 then
                traceovr = tract[21];
        elsif tsize then
                traceovr = tract[19];
                else
                traceovr = tract[17];
        end if;

-- PromICE is talking to the interface
        -- route data to local node etc., read/write registers if selectrace then
                if regbank then
                        case pa[] is
                                when TRCNTLA =>
                                        pwctla = vcc;
                                when STARTX =>
                                        pwstartx = vcc;
                                when STARTH =>
                                        pwstarth = vcc;
                                when STARTM =>
                                        pwstartm = vcc;
                                when STARTL =>
                                        pwstartl = vcc;
                                when STOPX =>
                                        pwstopx = vcc;
                                when STOPH =>
                                        pwstoph = vcc;
                                when STOPM =>
                                        pwstopm = vcc;
                                when STOPL =>
                                        pwstopl = vcc;
                                when CNTAH =>
                                        pwacntah = vcc;
                                        pdb[] = acnta[15..8];
                                when CNTAL =>
                                        pwacntal = vcc;
                                        pdb[] = acnta[7..0];
```

```
                    when CNTBH =>
                            pwacntbh = vcc;
                            pdb[] = acntb[15..8];
                    when CNTBL =>
                            pwacntbl = vcc;
                            pdb[] = acntb[7..0];
            end case;
        else
            -- alb, aeb, agb, ageb, aneb, aleb
            if csize then
                    (,iseqs,,,,isges)= lpm_compare(starta[], ta[],,)
with(LPM_WIDTH=32,ONE_INPUT_IS_CONSTANT="YES");
                    (,iseqp,,islep,,)= lpm_compare(stopa[], ta[],,)
with(LPM_WIDTH=32,ONE_INPUT_IS_CONSTANT="YES");
            else
                    (,iseqs,,,,isges)= lpm_compare(starta[23..0], ta[23..0],,)
with(LPM_WIDTH=24,ONE_INPUT_IS_CONSTANT="YES");
                    (,iseqp,,islep,,)= lpm_compare(stopa[23..0], ta[23..0],,)
with(LPM_WIDTH=24,ONE_INPUT_IS_CONSTANT="YES");
            end if;

-- trace all if tracea then
                    tracequ = vcc;
                    tracevent = vcc;
            end if;

-- trace from start address if traces then
                    if tracer then
                            if isges then
                                    tracequ = vcc;
                                    tracevent = vcc;
                            end if;
                    else
                            if iseqs then
                                    tracevent = vcc;
                                    startevnt = trclk;
                            end if;
                    end if;
            end if;

if twrite then
                    -- we are writing the trace data byte at a time
                    tract[].clk    = pwr;
                    tdoenb         = vcc;
                    case pa[] is
                            when TRACED0 =>
                                    tdout[7..0]        = pd[];
                                    trwe0              = pwr;
                            when TRACED1 =>
```

```
                                        tdout[15..8]      = pd[];
                                        trwe1             = pwr;
                                when TRACED2 =>
                                        tdout[23..16]     = pd[];
                                        trwe2             = pwr;
                                when TRACED3 =>
                                        tdout[31..24]     = pd[];
                                        tracenb           = vcc;    % clock address
                counter now %
                                        trwe3             = pwr;
                        end case;
                else
                        -- reading the trace data enable outputs
                        tract[].clk      = prd;
                        troe             = gnd;
                        case pa[] is
                                when TRACED0 =>
                                        pdb[] = ta[7..0];
                                when TRACED1 =>
                                        pdb[] = ta[15..8];
                                when TRACED2 =>
                                        pdb[] = ta[23..16];
                                when TRACED3 =>
                                        pdb[] = ta[31..24];
                                        tracenb = vcc;
                        end case;
                end if;
        end if;
end if;

-- connect the trace data output mux to target address bus
-- operate the two counters when tracing in on if start then
        acnta[].clk      = trclk;
        acntb[].clk      = trclk;
        acnta[].ena      = acntaenb;
        acntb[].ena      = acntbenb;
        acnta[]          = acnta[] + 1;
        acntb[]          = acntb[] + 1;

case (tracecb, tracaca) is
                when NONE =>
                        tracenb = tracequ;
                        geindic = vcc;
                when ONE =>
                        if !tracecao then
                                if tracevent then
                                        acntaenb = vcc;
                                else
                                        tracenb = tracequ;
                                end if;
                        else
                                tracenb = tracequ;
                                geindic = vcc;
                        end if;
                        -- any trace will do it
```

```
                    if tracenb then
                            setrace    = trclk;
                    end if;
            end if;
-- End of Code Trace Interface Design
-- + - + - + - + - + - + - + - + - + - + - + - + - + - + - + - + - + - +
-- start of XMAP Interface -- write the control bits in a (xtrdelay1, xtrdelay0, xgenwrite, xsize, xwrite, xmine, xstart).clk      = pwr;
            (xtrdelay1, xtrdelay0, xgenwrite, xsize, xwrite, xmine, xstart).ena      = pwxctla;
            (xtrdelay1, xtrdelay0, xgenwrite, xsize, xwrite, xmine, xstart).d        = pd[6..0];

-- write the control register b (xbreakcb, xbreakca, xbreakhe, xtracecb, xtraceca, xtracep, xtraces, xtracea).clk = pwr;
            (xbreakcb, xbreakca, xbreakhe, xtracecb, xtraceca, xtracep, xtraces, xtracea).ena = pwxctlb;
            (xbreakcb, xbreakca, xbreakhe, xtracecb, xtraceca, xtracep, xtraces, xtracea).d   = pd[];
            (xstoptrace, xstartrace, xbreakher, xtraceps, xtracess, xtraceas).clk  = pwr;
            (xstoptrace, xstartrace, xbreakher, xtraceps, xtracess, xtraceas).ena  = pwxctlb;
            (xstoptrace, xstartrace, xbreakher, xtraceps, xtracess, xtraceas).d    = (gnd, gnd, gnd, gnd, gnd,
gnd);
            xstoptrace.prn   = xsetstop;
            xstartrace.prn   = xsetstart;
            xbreakher.prn    = xsetbs;
            xtraceps.prn     = xsetps;
            xtracess.prn     = xsetss;
            xtraceas.prn     = xsetas;

-- write control register c end case;
            end if;

-- operate the xmemory interface per control bit settings

!xtrclk = (xusetclk & !tclk & xtrdelay) # (xusexclk & !xclk & xtrdelay);

if xstart then
                    if !xmine then
                            if xsize then
                                    xmapx[] = b"00000111";   % 4M SRAMs %
                            else
                                    xmapx[] = b"00000001";   % 1M SRAMs %
                            end if;

-- see which memory is selected (,xmapeq0,,,,) = lpm_compare(xmape0[]#xmapx[],ta[23..16]#xmapx[],,)

with(LPM_WIDTH=8,ONE_INPUT_IS_CONSTANT="YES");
                            (,xmapeq1,,,,) = lpm_compare(xmape1[]#xmapx[],ta[23..16]#xmapx[],,)

with(LPM_WIDTH=8,ONE_INPUT_IS_CONSTANT="YES");
                            (,xmapeq2,,,,) = lpm_compare(xmape2[]#xmapx[],ta[23..16]#xmapx[],,)
```

40

```
            with(LPM_WIDTH=8,ONE_INPUT_IS_CONSTANT="YES");
                    (,xmapeq3,,,,) = lpm_compare(xmape3[]#xmapx[],ta[23..16]#xmapx[],,)

5           with(LPM_WIDTH=8,ONE_INPUT_IS_CONSTANT="YES");

-- generate the chip enable and make sure there is only one

!xmce0 = xmapeq0 & mape0;
10                  !xmce1 = xmapeq1 & mape1 & xmce0;
                    !xmce2 = xmapeq2 & mape2 & xmce1 & xmce0;
                    !xmce3 = xmapeq3 & mape3 & xmce2 & xmce1 & xmce0;

-- if doing code coverage then write the CONTROLB register to memory
15
                    if cover then
                            !xmwe = !xtrclk;
                            xmdb[] = (xbreakcb, xbreakca, xbreakhe, xtracecb, xtraceca, xtracep,
        xtraces, xtracea);
20                          xmdenb = vcc;

else -- tracing!!
                            xmoe = gnd;

25                          -- trace all if xmd[0] & xtracea then
                                    xtracequ = vcc;
                                    xtracevnt = vcc;
30                                  xsetasevnt = xtrclk;
                            end if;

-- trace xstart here 35                          if xmd[1] & xtraces then
                                    xtracequ = vcc;
                                    xtracevnt = vcc;
                                    xstartevnt = xtrclk;
                                    xsetssevnt = xtrclk;
40                          end if;

if xgeindic then
                            xsetstart = xstartevnt;
                            xsetstop = xstopevent;
45                          xsetas       = xsetasevnt;
                            xsetss       = xsetssevnt;
                            xsetps       = xsetpsevnt;
                    end if;
            end if;
50      end;
        -- End of XMAP Interface Design
```

The improved code coverage system of the present invention allows real-time, hardware implemented, code coverage, where the user defined, multi-bit bit patterns may be used to provide information on monitored memory access and execution paths. Additionally, as discussed, the code coverage memory of the present invention may alternatively be used for fine trace control. The present invention provides software developers and diagnostic testers with detailed information about monitored program execution allowing for more efficient system design and testing.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. An emulation system for collecting predetermined code coverage data comprising:
    an emulation circuit, said emulation circuit comprising:
    a.) an emulated memory;
    b.) a controller circuit in electrical communication with said emulated memory;
    c.) address lines connected to said emulated memory; and
    d.) data lines connected to said emulated memory;
    a code coverage memory, said code coverage memory having address inputs and data inputs, wherein signals on said address lines of said emulation circuit are received at said address inputs of said code coverage memory;
    a code coverage control circuit for providing predetermined code coverage data to said data inputs of said code coverage memory; and
    a trace memory for storing trace data of said emulated memory said trace memory having address inputs and data inputs wherein said data inputs of said trace memory receive signals from said address lines of said emulation circuit.

2. An emulation system according to claim 1 wherein said predetermined code coverage data is loaded into said code coverage memory in real-time.

3. An emulation system according to claim 1, wherein said predetermined code coverage data is passed to said code coverage memory via a register in said code coverage control circuit.

4. An emulation system according to claim 1, wherein said code coverage control circuit for providing predetermined code coverage data is part of a programmable logic device.

5. An emulation system according to claim 1, wherein said predetermined code coverage data is varied for different tests of said emulated memory.

6. An emulation system according to claim 1, wherein said code coverage memory is 8 bits wide.

7. An emulation system according to claim 1, further comprising:
    a buffer circuit for interfacing said trace memory to said interface circuit, and wherein said buffer circuit allows signals from said address lines of said emulation circuit to be sent to said trace memory when in a trace mode and wherein said buffer circuit isolates said address lines of said emulation circuit from said trace memory when access to said trace memory is initiated.

8. An emulation system according to claim 1, further comprising a trace control circuit for providing signals to said address inputs of said trace memory.

9. An emulation system according to claim 8, wherein said trace control circuit for providing signals to said address inputs of said trace memory is comprised of a counter circuit.

10. An emulation system according to claim 9, wherein said counter circuit is incremented to increment said trace memory from a first address to a second address when trace data is to be retained in said first address.

11. An emulation system according to claim 8, wherein said trace control circuit for providing signals to said address inputs of said trace memory is part of a programmable logic device.

12. An emulation system according to claim 1, wherein said code coverage memory is used to store predetermined fine trace control data.

13. An emulation system according to claim 12, further comprising:
    a fine trace control circuit wherein said fine trace control circuit is adapted to retrieve said fine trace control data from said code coverage memory in real-time.

14. An emulation system according to claim 13, wherein said fine trace control circuit is part of a programmable logic device.

15. An emulation system according to claim 13, wherein said fine trace control circuit is adapted to skip trace when a predetermined fine trace control data pattern is retrieved from said code coverage memory.

16. An emulation system according to claim 13, wherein said fine trace control circuit is adapted to send an interrupt signal to a target processing system to stop operation when a predetermined fine trace control data pattern is retrieved from said code coverage memory.

17. An emulation circuit according to claim 1, wherein said code coverage control circuit is adapted to provide a predetermined bit pattern to said code coverage memory and wherein said predetermined bit pattern is loaded into an address location of said code coverage memory relating to said signals received at said address inputs of said code coverage memory from said address lines of said emulation circuit.

18. An emulation circuit according to claim 1, wherein said code coverage control circuit is adapted to provide a predetermined bit pattern to said code coverage memory and wherein said predetermined bit pattern is loaded into an address location of said code coverage memory corresponding to an address of said emulated memory concurrently being accessed.

19. A system for providing real-time code coverage data on a memory monitored by said system, said code coverage data providing information regarding accesses to said monitored memory, said monitored memory being connected to address lines and data lines, said system comprising:
    a code coverage memory, said code coverage memory having address inputs and data inputs, wherein signals on said address lines connected to said monitored memory are received at said address inputs of said code coverage memory;
    a code coverage control circuit for providing predetermined code coverage data to said data inputs of said code coverage memory; and
    wherein said code coverage memory is comprised of multiple locations, each of said locations having a predetermined width, said code coverage control circuit adapted to provide said predetermined code coverage data in real-time concurrently with said accesses to said monitored memory.

20. A system according to claim 19, wherein said code coverage control circuit is comprised of:
   a register in electrical communication with said code coverage memory, and wherein said register may be loaded with predetermined bit patterns, said predetermined bit patterns providing information on said accesses to said monitored memory.

21. A system according to claim 20, wherein said predetermined bit patterns may be varied for different tests run through said monitored memory.

22. A system according to claim 19, further comprising:
   a trace memory, said trace memory having address inputs and data inputs, wherein signals on said address lines connected to said monitored memory are received at said data inputs of said trace memory for storage in said trace memory; and
   a trace control circuit in electrical communication with said address inputs of said trace memory, wherein said trace control circuit is adapted to output signals to said address inputs of said trace memory to change the location in said trace memory to which said signals on said address lines connected to said monitored memory are stored.

23. A system according to claim 22 wherein said code coverage memory is loaded with fine trace control data, and wherein said system is further comprised of:
   a fine trace control circuit wherein said fine trace control circuit is adapted to retrieve said fine trace control data from said code coverage memory in real-time.

24. A system according to claim 23 wherein said trace control circuit is adapted to process said fine trace control data and provide a break point when said trace control circuit receives predetermined fine trace control data.

25. A system according to claim 23, wherein said fine trace control circuit is comprised of:
   a register for holding data received from signals on said address lines connected to said monitored memory; and
   wherein said fine trace control circuit retrieves fine trace control data relating to said signals on said address lines connected to said monitored memory to perform fine trace functions.

26. A system according to claim 19, further comprising:
   a buffer circuit for isolating said code coverage memory from said memory being monitored and wherein said buffer circuit is turned on during a tracing mode and turned off during a read mode of said code coverage memory.

27. A system according to claim 19, wherein said code coverage control circuit is adapted to read said code coverage data from said code coverage memory, and wherein said system is further comprised of:
   a host computer for retrieving said code coverage data from said code coverage control circuit.

28. A system according to claim 19, wherein said memory being monitored by said system is an emulated memory and wherein said emulated memory is connected to a ROM socket of a target computer system.

29. A method for monitoring accesses to a monitored memory for providing real-time code coverage data, said monitored memory connected to address lines and data lines, said method comprising the steps of:
   providing a code coverage memory, said code coverage memory having data inputs and address inputs;
   electrically connecting said address inputs of said code coverage memory to said address lines;
   accessing locations of said monitored memory, said locations determined by signals on said address lines;
   receiving said signals on said address lines at said address inputs of said code coverage memory; and
   loading a predetermined bit pattern into a memory location in said code coverage memory, said memory location based on said signals on said address lines at said address inputs of said code coverage memory.

30. The method of claim 29, further comprising the step of:
   changing the predetermined bit pattern to be loaded into said code coverage memory when a different test is being run through said monitored memory.

31. The method of claim 29, further comprising the step of:
   providing a trace memory, said trace memory having address inputs and data inputs;
   electrically connecting said data inputs of said trace memory to said address lines; and
   storing said signals on said address lines in a predetermined location in said trace memory.

32. The method of claim 29, further comprising the step of:
   providing a trace control circuit, said trace control circuit connected to said address inputs of said trace memory; and
   transmitting signals representing an address location of said trace memory to which said signals on said address lines are to be entered.

33. The method of claim 32, further comprising the step of:
   changing said signals representing an address location of said trace memory when said signals currently on said address lines are to be saved.

34. The method of claim 29, further comprising the steps of:
   providing a host computer system for retrieving said code coverage data from said code coverage memory; and
   processing said code coverage data for extrapolating information regarding accesses to said monitored memory.

35. A system for providing real-time code coverage data on a memory monitored by said system, said code coverage data providing information regarding accesses to said monitored memory, said monitored memory being connected to address lines and data lines, said system comprising:
   a code coverage memory, said code coverage memory having address inputs and data inputs, wherein signals on said address lines connected to said monitored memory are received at said address inputs of said code coverage memory; and
   a code coverage control circuit for providing predetermined code coverage data to said data inputs of said code coverage memory, wherein said code coverage memory is comprised of multiple locations, each of said locations having a predetermined width, said code coverage control circuit adapted to provide said predetermined code coverage data in real-time concurrently with said accesses to said monitored memory.

36. A system according to claim 35, wherein said code coverage control circuit is comprised of:
   a register in electrical communication with said code coverage memory, and wherein said register may be loaded with predetermined bit patterns, said predetermined bit patterns providing information on said accesses to said monitored memory.

37. A system according to claim 36, wherein said predetermined bit patterns may be varied for different tests run through said monitored memory.

38. A system according to claim 35, wherein said code coverage memory is mapped and external signals are received at said code coverage control circuit for determining where in said code coverage memory said code coverage data is to be stored.

39. A system according to claim 35, further comprising:

a trace memory, said trace memory having address inputs and data inputs, wherein signals on said address lines connected to said monitored memory are received at said data inputs of said trace memory for storage in said trace memory; and a trace control circuit in electrical communication with said address inputs of said trace memory, wherein said trace control circuit is adapted to output signals to said address inputs of said trace memory to change the location in said trace memory to which said signals on said address lines connected to said monitored memory are stored.

40. A system according to claim 39 wherein said code coverage memory is loaded with fine trace control data, and wherein said system is further comprised of:

a fine trace control circuit wherein said fine trace control circuit is adapted to retrieve said fine trace control data from said code coverage memory in real-time.

41. A system according to claim 39 wherein external data signals are received at said data inputs of said trace memory for storage in said trace memory.

42. An emulation system for collecting predetermined code coverage data comprising:

an emulation circuit, said emulation circuit comprising:
a.) an emulated memory;
b.) a controller circuit in electrical communication with said emulated memory;
c.) address lines connected to said emulated memory; and
d.) data lines connected to said emulated memory;

a code coverage memory, said code coverage memory having address inputs and data inputs, wherein signals on said address lines of said emulation circuit are received at said address inputs of said code coverage memory;

a code coverage control circuit for providing predetermined code coverage data to said data inputs of said code coverage memory;

a first buffer circuit for interfacing said code coverage memory and said emulation circuit; and wherein said first buffer circuit allows signals from said address lines of said emulation circuit to be sent to said code coverage memory when in a code coverage mode and wherein said first buffer circuit isolates said address lines of said emulation circuit from said code coverage memory when access to said code coverage memory is initiated.

* * * * *